США011314562B2

(12) United States Patent
Dice

(10) Patent No.: US 11,314,562 B2
(45) Date of Patent: Apr. 26, 2022

(54) SYSTEMS AND METHODS FOR PERFORMING CONCURRENCY RESTRICTION AND THROTTLING OVER CONTENDED LOCKS

(71) Applicant: Oracle International Corporation, Redwood City, CA (US)

(72) Inventor: David Dice, Foxboro, MA (US)

(73) Assignee: Oracle International Corporation, Redwood City, CA (US)

(*) Notice: Subject to any disclaimer, the term of this patent is extended or adjusted under 35 U.S.C. 154(b) by 130 days.

(21) Appl. No.: 16/570,952

(22) Filed: Sep. 13, 2019

(65) Prior Publication Data

US 2020/0012538 A1 Jan. 9, 2020

Related U.S. Application Data

(63) Continuation of application No. 14/818,213, filed on Aug. 4, 2015, now Pat. No. 10,417,056.

(51) Int. Cl.
*G06F 9/52* (2006.01)

(52) U.S. Cl.
CPC .................................. *G06F 9/526* (2013.01)

(58) Field of Classification Search
None
See application file for complete search history.

(56) References Cited

U.S. PATENT DOCUMENTS

| 4,574,350 A | 3/1986 | Starr |
| 4,716,528 A | 12/1987 | Crus et al. |
| 5,414,839 A | 5/1995 | Joshi |
| 6,247,025 B1 | 6/2001 | Bacon |
| 6,735,760 B1 | 5/2004 | Dice |
| 6,792,601 B1 | 9/2004 | Dimpsey et al. |
| 7,318,128 B1 | 1/2008 | Dice |
| 7,594,234 B1 | 9/2009 | Dice |

(Continued)

OTHER PUBLICATIONS

John M. Mellor-Crummey, et al., "Algorithms for scalable synchronization on shared-memory multiprocessors", ACM Transactions on Computer Systems, vol. 9, No. 1, Feb. 1991, 21-65.

(Continued)

*Primary Examiner* — Lewis A Bullock, Jr.
*Assistant Examiner* — Melissa A Headly
(74) *Attorney, Agent, or Firm* — Robert C. Kowert; Kowert, Hood, Munyon, Rankin & Goetzel, P.C.

(57) ABSTRACT

A concurrency-restricting lock may divide a set of threads waiting to acquire the lock into an active circulating set (ACS) that contends for the lock, and a passive set (PS) that awaits an opportunity to contend for the lock. The lock, which may include multiple constituent lock types, lists, or queues, may be unfair over the short term, but improve throughput of the underlying multithreaded application. Culling and long-term fairness policies may be applied to the lock to move excess threads from the ACS to the PS or promote threads from the PS to the ACS. These policies may constraint the size or distribution of threads in the ACS (which may be NUMA-aware). A waiting policy may avoid aggressive promotion from the PS to the ACS, and a short-term fairness policy may move a thread from the tail of a list or queue to its head.

20 Claims, 11 Drawing Sheets

(56) References Cited

U.S. PATENT DOCUMENTS

| | | | |
|---|---|---|---|
| 7,844,973 | B1 | 11/2010 | Dice |
| 8,046,758 | B2 | 11/2011 | Dice |
| 8,051,418 | B1 | 11/2011 | Dice |
| 8,245,207 | B1 | 8/2012 | English et al. |
| 8,407,708 | B2 | 3/2013 | Dice |
| 8,694,706 | B2 | 4/2014 | Dice et al. |
| 8,775,837 | B2 | 7/2014 | Dice et al. |
| 10,417,056 | B2 * | 9/2019 | Dice ............ G06F 9/526 |
| 2003/0041173 | A1 | 2/2003 | Hoyle |
| 2003/0236816 | A1 | 12/2003 | Venkatasubramanian |
| 2005/0028157 | A1 | 2/2005 | Betancourt et al. |
| 2005/0081204 | A1 | 4/2005 | Schopp |
| 2006/0026566 | A1 | 2/2006 | Cabillic et al. |
| 2006/0048149 | A1 | 3/2006 | Clift |
| 2007/0093243 | A1 | 4/2007 | Kapadekar et al. |
| 2007/0136725 | A1 | 6/2007 | Accapadi et al. |
| 2007/0169002 | A1 | 7/2007 | Kronlund et al. |
| 2008/0184238 | A1 | 7/2008 | Ruemmler |
| 2010/0100889 | A1 | 4/2010 | Labrie et al. |
| 2010/0241774 | A1 | 9/2010 | Olszewski et al. |
| 2012/0246652 | A1 | 9/2012 | King-Smith et al. |
| 2012/0291034 | A1 | 11/2012 | Kamath et al. |
| 2012/0311606 | A1 | 12/2012 | Marathe et al. |
| 2013/0290583 | A1 | 10/2013 | Dice et al. |
| 2013/0290967 | A1 | 10/2013 | Calciu et al. |
| 2014/0373029 | A1 | 12/2014 | Levine et al. |
| 2015/0026688 | A1 | 1/2015 | Dice et al. |
| 2015/0286586 | A1 | 10/2015 | Yadav |
| 2015/0301871 | A1 * | 10/2015 | Duvuru ............ G06F 9/526 718/104 |
| 2016/0092280 | A1 | 3/2016 | Al et al. |
| 2017/0220474 | A1 | 8/2017 | Dice et al. |

OTHER PUBLICATIONS

David Dice, et al., "Lock Cohorting: A General Technique for Designing NUMA Locks", ACM Transactions on Parallel Computing, vol. 1, No. 2, Article 13, Publication date: Jan. 2015, pp. 13:1-13:42.

Anderson, T.E., "The performance of spin lock alternatives for shared-money multiprocessors," IEEE Transactions on Parallel and Distributed Systems vol. 1, No. 1, Jan. 1990, pp. 6-16.

Jons-Tobias Wamhoff, et al., "The Turbo Diaries: Application-controlled Frequency Scaling Explained", USENIX ATC '14: 2014 USENIX Annual Technical Conference, Jun. 19-20, 2014, Retrieved from URL: https://www.usenix.org/system/files/conference/atc14/atc14-paper-wamhoff.pdf, pp. 192-204.

David Dice, et al., "Lock cohorting: A General Technique for Designing NUMA Locks", Proceedings of the 17th ACM SIGPLAN Symposium on Principles and Practice of Parallel Programming (PPoPP '12), 2012, ACM, pp. 247-256, New York, NY, USA.

Stijn Eyerman, et al., "Modeling Critical Sections in Amdahl's Law and its Implications for Multicore Design", In Proceedings of the 37th Annual International Symposium on Computer Architecture (ISCA '10), ACM, Jun. 19-23, 2010, pp. 362-370.

"Inverted schedctl usage in the JVM", Jun. 21, 2011, Retrieved from URL: https://blogs.oracle.com/dave/entry/inverted_schedctl_usage_in_the, Downloaded Sep. 24, 2015, pp. 1-6.

"Measuring long-term fairness for locks", Dec. 29, 2014, Retrieved from URL: https://blogs.oracle.com/dave/entry/measuring_long_term_fairness_for, Downloaded Sep. 24, 2015, pp. 1-4.

"Measuring short-term fairness for locks", Dec. 29, 2014, Retrieved from URL: https://blogs.oracle.com/dave/entry/measuring_short_term_fairness_for, Downloaded Sep. 24, 2015, pp. 1-4.

"Polite busy-waiting with WRPAUSE on SPARC", Oct. 24, 2012, Retrieved from URL: https://blogs.oracle.com/dave/entry/polite_busy_waiting_with_wrpause, Downloaded Sep. 24, 2015, pp. 1-6.

"TXPAUSE: polite waiting for hardware transactional memory", Oct. 25, 2012, Retrieved from URL: https://blogs.oracle.com/dave/entry/txpause_polite_waiting_for_hardware, Downloaded Sep. 24, 2015, pp. 1-5.

Davidlohr Bueso, "Scalability techniques for practical synchronization primitives", ACM, 2014. Retrieved from URL: http://delivery.acm.org/10.1145/2700000/2698990/p40-bueso.pdf. Downloaded Oct. 22, 2015, pp. 1-14.

John M. Mello-Crummey, et al., "Algorithms for Scalable Synchronization on Shared-Memory Multiprocessors", ACM Transactions on Computer Systems (TOCS) 9.1, 1991, pp. 21-65.

F. Ryan Johnson, et al., "Decoupling Contention Management from Scheduling", ACM SIGARCH Computer Architecture News 38.1, 2010, pp. 117-128.

David Dice, "Malthusian Locks", Retrieved from URL: http://arxiv.org/abs/1511.06035v2, 2015, pp. 1-13.

Irina Calciu, et al., "Message Passing or Shared Memory: Evaluating the Delegation Abstraction for Multicores", International Conference on Principles of Distributed Systems, Springer International Publishing, 2013, pp. 83-97.

U.S. Appl. No. 15/298,090, filed Oct. 19, 2016, David Dice et al.

* cited by examiner

SYSTEMS AND METHODS FOR PERFORMING CONCURRENCY RESTRICTION AND THROTTLING OVER CONTENDED LOCKS

FIELD OF THE DISCLOSURE

This application is a continuation of U.S. patent application Ser. No. 14/818,213, filed Aug. 4, 2015, which is hereby incorporated by reference herein in its entirety.

BACKGROUND

This disclosure relates generally to managing accesses to shared resources in a multithreaded environment, and more particularly to systems and methods for performing concurrency restriction and throttling over contended locks.

Description of the Related Art

In a multiprocessor environment with threads and pre-emptive scheduling, threads can participate in a mutual exclusion protocol through the use of lock or "mutex" constructs. A mutual exclusion lock can either be in a locked state or an unlocked state, and only one thread can hold or own the lock at any given time. The thread that owns the lock is permitted to enter a critical section of code protected by the lock or otherwise access a shared resource protected by the lock. If a second thread attempts to obtain ownership of a lock while the lock is held by a first thread, the second thread will not be permitted to proceed into the critical section of code (or access the shared resource) until the first thread releases the lock and the second thread successfully claims ownership of the lock.

In modern multicore environments, it can often be the case that there are a large number of active threads, all contending for access to a shared resource. As multicore applications mature, situations in which there are too many threads for the available hardware resources to accommodate are becoming more common. This can been seen in component-based applications with thread pools, for example. Often, access to such components are controlled by contended locks. As threads are added, even if the thread count remains below the number of logical CPUs, the application can reach a point at which aggregate throughput drops. In this case, if throughput for the application is plotted on the y-axis and the number of threads is plotted on the x-axis, there will be an inflection point beyond which the plot becomes a concave plot. Past inflection point, the application encounters "scaling collapse" such that, as threads are added, performance drops. In modern layered component-based environments it can difficult to determine a reasonable limit on the thread count, particularly when mutually-unaware components are assembled to form an application.

Current trends in multicore architecture design imply that in coming years, there will be an accelerated shift away from simple bus-based designs towards distributed non-uniform memory-access (NUMA) and cache-coherent NUMA (CC-NUMA) architectures. Under NUMA, the memory access time for any given access depends on the location of the accessed memory relative to the processor. Such architectures typically consist of collections of computing cores with fast local memory (as found on a single multicore chip), communicating with each other via a slower (inter-chip) communication medium. In such systems, the processor can typically access its own local memory, such as its own cache memory, faster than non-local memory. In some systems, the non-local memory may include one or more banks of memory shared between processors and/or memory that is local to another processor. Access by a core to its local memory, and in particular to a shared local cache, can be several times faster than access to a remote memory (e.g., one located on another chip). Note that in various descriptions herein, the term "NUMA" may be used fairly broadly. For example, it may be used to refer to non-uniform communication access (NUCA) machines that exhibit NUMA properties, as well as other types of NUMA and/or CC-NUMA machines.

On large cache-coherent systems with Non-Uniform Memory Access (CC-NUMA, sometimes shortened to just NUMA), if lock ownership migrates frequently between threads executing on different nodes, the executing program can suffer from excessive coherence traffic, and, in turn, poor scalability and performance. Furthermore, this behavior can degrade the performance of other unrelated programs executing in the system.

SUMMARY

A concurrency-restricting lock may divide a set of threads waiting to acquire the lock into two sets: an active circulating set (ACS) that is currently able to contend for the lock, and a passive set (PS) that awaits an opportunity to be able to contend for the lock (e.g., by joining the active circulation set). For example, the ACS may include the current lock owner, threads that are waiting to acquire the lock (e.g., one thread or a small number of threads), and/or threads that are currently executing their non-critical sections (e.g., one thread or a small number of threads that may attempt to acquire the lock when they reach their critical sections). In some embodiments, each of the threads in the ACS may circulate from executing its non-critical section to waiting, from waiting to lock ownership and execution of its critical section, and then back to executing its non-critical section. Various admission policies, some of which are NUMA-aware, may place arriving threads in one of the two sets randomly, on a first-come-first served basis, or using other criteria, in different embodiments.

The concurrency-restricting lock may include multiple constituent lock types, lists, or queues, in some embodiments. For example, in various embodiments, the concurrency-restricting lock may include an inner lock and an outer lock of different lock types, a main stack (or queue) representing the ACS and an excess list representing the PS, and/or a single stack (or queue), portions of which represent the ACS and PS (with or without an additional list of excess or remote threads). The concurrency-restricting lock may be unfair over the short term, but may improve the overall throughput of the underlying multithreaded application through passivation of a portion of the waiting threads, and various techniques for managing the intermixing of threads from the ACS and PS, the selection of a successor for lock ownership, and the handoff between the lock owner and its successor.

In some embodiments, a culling policy may be applied to the concurrency-restricting lock to move excess threads from the ACS to the PS. The culling policy may limit the size and/or distribution of threads in the ACS (which may be NUMA-aware). In some embodiments, a long-term fairness policy may be applied to the concurrency-restricting lock to promote threads from the PS to the ACS. The long-term fairness policy may also constrain the size and/or distribution of threads in the ACS (especially in embodiments in which the concurrency-restricting lock is NUMA-aware).

In some embodiments (e.g., in those in which the ACS is represented by an unfair stack or queue, such as one that implements LIFO ordering), a short-term fairness policy may, from time to time, move a thread from the tail of the stack or queue to the head of the stack or queue. In some embodiments (e.g., embodiments in which the lock ownership succession policy has a preference for threads already in the ACS, rather than threads in the PS), a waiting policy (such as an "anti-spinning" approach) may avoid aggressive promotion from the PS to the ACS.

Several specific, but non-limiting, examples of concurrency-restricting locks (some of which are NUMA-aware) are described in detail herein, including an outer-inner dual path lock, and concurrency-restricting locks that have been constructed through the transformation of various MCS type locks and LIFO structures.

Figure 1:
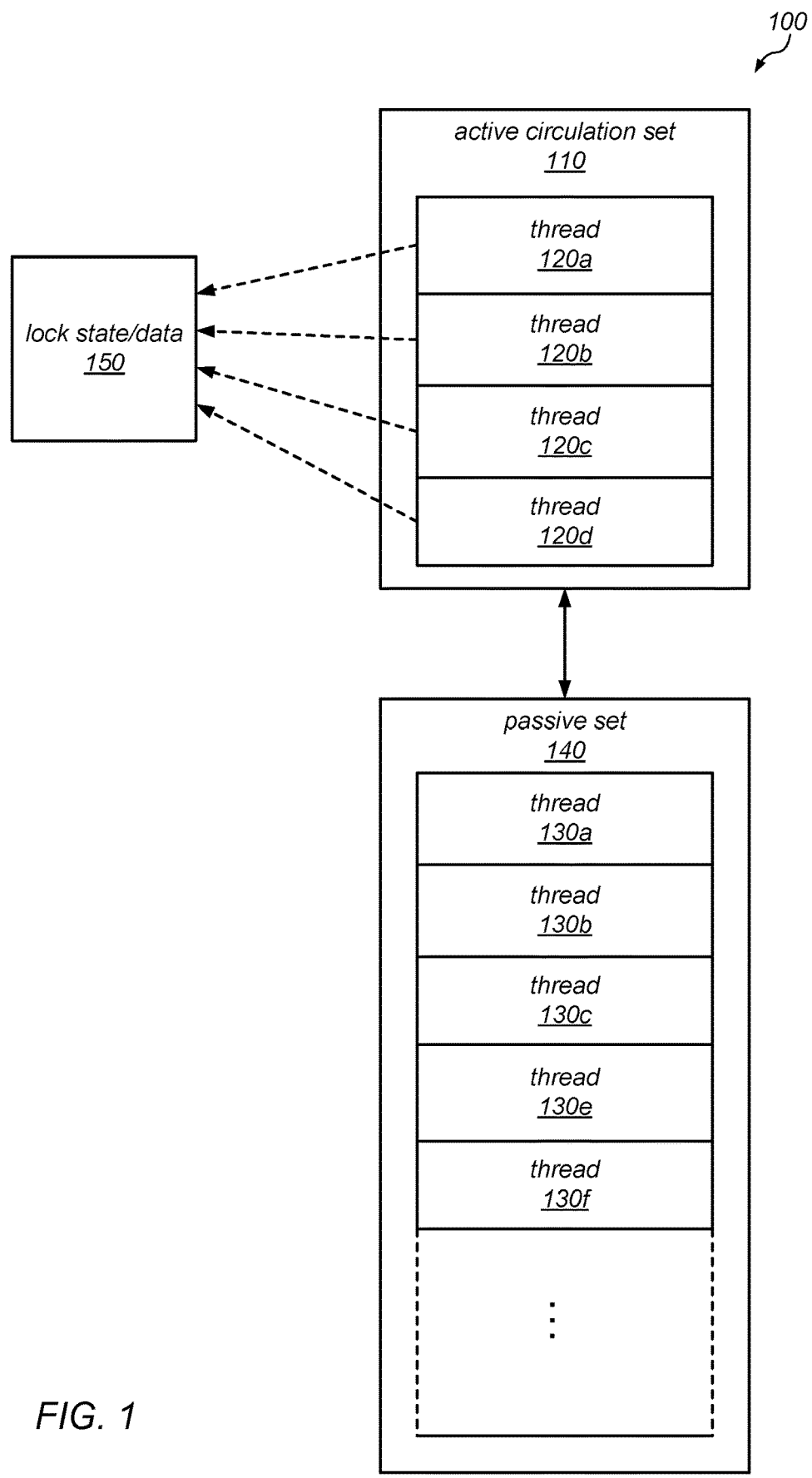
FIG. 1 is a block diagram illustrating one embodiment of a concurrency-restricting lock, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must).

Similarly, the words "include", "including", and "includes" mean including, but not limited to.

DETAILED DESCRIPTION OF EMBODIMENTS

As noted above, as multicore applications mature, developers may face situations in which there are too many threads for the available hardware resources to be able to handle effectively and/or fairly. For example, this may been the case in component-based applications that employ thread pools. Often, such components have contended locks. In some embodiments of the systems described herein, concurrency-restricting modifications to those locks may be leveraged to restrict the number of threads in circulation, thus reducing destructive interference (e.g., in last-level shared caches, or for other types of shared resources).

For example, in some cases, a contended lock that protects and/or controls access to a critical section of code (CS) or shared resource may have an excessive number of threads circulating through the contended lock. In this context, the term "excessive" may refer to a situation in which there are more than enough threads circulating over the lock to keep the lock fully saturated. In such situations, the excess or surplus threads typically do not contribute to performance, and often degrade overall collective throughput. In some embodiments, in order to reduce interference and improve performance, the systems described herein may apply selective culling and/or passivation of some of the threads circulating over the lock. While these techniques may be considered palliative, in practice, they may be effective in a variety of different contexts and applications, in different embodiments. In addition, in scenarios in which they are ineffective, these techniques may at least do no harm (e.g., they may not negatively affect performance or resource sharing).

As used herein, the term "lock working set" (LWS) may refer to the set of threads that circulates over a lock during some interval. In various embodiments, the techniques described herein may strive to minimize the LWS size over short intervals while still keeping the lock fully saturated and subscribed. In some embodiments, this may be accomplished by partitioning the circulating threads into an "active circulation set" (sometimes referred to herein as the ACS) and a "passive set" (sometimes referred to as the PS). The techniques described herein may act to minimize the size of the ACS while still remaining work conserving. For example, these techniques may be used to ensure that the ACS is sufficiently large to saturate the lock (so that the lock is not unnecessarily under-provisioned), but no larger. By restricting and constraining the size of the ACS, the number of threads circulating over the lock in a given interval may be reduced.

In some embodiments, the lock subsystems described herein may deactivate and/or quiesce threads in the passive set through culling operations that act to minimize the size of the ACS. Under fixed load, aggressive culling may cause the system to devolve to a state where there is at most one member of the ACS waiting to acquire the lock, while other threads wait in the PS for an opportunity to contend for the lock. In this state, the ACS may include that one waiting thread, the current owner of the lock (which may be executing a critical section of code and/or accessing a shared resource that is protected by the lock), and a number of threads that are circulating through their respective non-critical sections. The waiting thread may typically acquire the lock after the lock owner releases it. Subsequently, some other member of the ACS may complete its non-critical section (NCS) and begin waiting for the lock, as in a classic birth-death renewal process. In some embodiments, the admission order may effectively be first-in-first-out (FIFO) ordering over the members of the ACS, regardless of the prevailing lock admission policies. In some such embodiments, the admission order schedule for the members of the ACS may be more precisely described as being round-robin cyclic.

In some embodiments that employ the concurrency-restricting mechanism described herein, threads in the ACS may have to busy-wait only briefly before acquiring a contended lock. In some embodiments, at most one thread in the ACS may be waiting to acquire a contended lock at any given moment. As described in more detail herein, excess threads may be quarantined in the PS and may be blocked in the kernel. In various embodiments, threads in the ACS may be thought of as being "enabled" and may operate normally, while threads in the PS may be thought of as being "disabled" and may not circulate over the lock. As described in more detail below, threads may, from time to time, be explicitly shifted between the active circulation set and the passive set (e.g., to ensure long-term fairness). In various embodiments, the techniques described herein may be used to constrain concurrency in order to protect resources (e.g., residency in shared caches). These technique may be unfair over the short-term, but may increase throughput.

The issues that may be addressed through the use of the concurrency-restricting techniques described herein may be illustrated by way of the following example. Assume that the threads of a multithreaded application loop through the following operations: 1) acquire a central lock; 2) execute a critical section of code that is protected by the central lock; 3) release the central lock; 4) execute a non-critical section of code. By Amdahl's law or Gustafson's reformulation, if the critical section length is C and the non-critical section period is N, then under ideal circumstances and scheduling, the maximum number of threads that can "fit" in the lock schedule before encountering contention (triggering the need for at least some threads to wait) may be calculated as $(N+C)/C$. In this ideal model, the techniques described herein may be used to hold the size of the ACS at approximately $(N+C)/L$ (or slightly above). In this case, the lock may be considered to be fully saturated or to have a sufficient quorum. In practice, over-saturation may be detected by detecting contention on the lock. For example, excessive waiting on the central lock (or on an outer lock of an outer-inner dual path lock, such as those described below) may indicate that there is a surplus of threads, and that it may be appropriate to apply one or more of the concurrency restriction techniques described herein. Note that, in various embodiments, these techniques may adapt automatically and immediately to varying load. In addition, these techniques may be robust and require no tuning.

One embodiment of a concurrency-restricting lock is illustrated by the block diagram in FIG. 1. In this example, a concurrency-restricting lock 100 (which may, in different embodiments, protect a critical section of code in a multi-threaded application or a shared resource accessed by multiple threads of a multithreaded application) includes a data structure 150 that stores data representing the lock state and/or other data associated with the lock (e.g., metadata representing the lock owner or preferred/home node, a pointer to a successor for lock ownership, or other information), a data structure 110 representing an active circulation set (e.g., a set of threads that circulate over the lock, contending for lock ownership), and a data structure 140 representing a passive set (e.g., a set of threads that are waiting for an opportunity to contend for ownership of the lock).

As illustrated in this example, a data structure representing the active circulation set (such as data structure 110) may maintain data representing multiple threads that (as indicated by the dashed lines from the elements 120a-120d to lock state/data 150) are currently contending for the concurrency-restricting lock (e.g., lock 100). As illustrated in this example, a data structure representing the passive set (such as data structure 140) may maintain data representing multiple threads that are not currently able to contend for ownership of the lock (e.g., at least elements 130a-130f). As illustrated by the bi-directional line between active circulation set 110 and passive set 140, and described in detail herein, in various embodiments, threads that are part of an active circulation set for a concurrency-restricting lock may be culled from the active circulation set and placed in the passive set (thus limiting the number of threads in active circulation) and/or threads that are part of the passive set for a concurrency-restricting lock may be promoted to the active circulation set (thus being afforded an opportunity to contend for the concurrency-restricting lock and increasing long-term fairness with respect to lock ownership). Various methods for determining when, and if, to apply such a culling operation or fairness policy are described herein, according to different embodiments.

In various embodiments, as threads arrive at a shared lock, they may be partitioned into multiple sets of threads, including an active circulation set (which may include threads that are circulating over the shared lock) and a passive set (which may include threads that are not immediately able to content for the shared lock, but that are awaiting an opportunity to contend for the shared lock), according to different admission policies. A thread in the active circulation set may, after acquiring the shared lock, access a critical section of code or shared resource that is protected by the shared lock, after which it may release the lock. As described herein, the thread releasing the shared lock may, in different embodiments, pass ownership of the shared lock to another thread in the active circulation set, may cull one or more threads from the active circulation set, and/or may promote one or more threads from the passive set to the active circulation set, according to different culling policies and/or different fairness policies.

Figure 2:
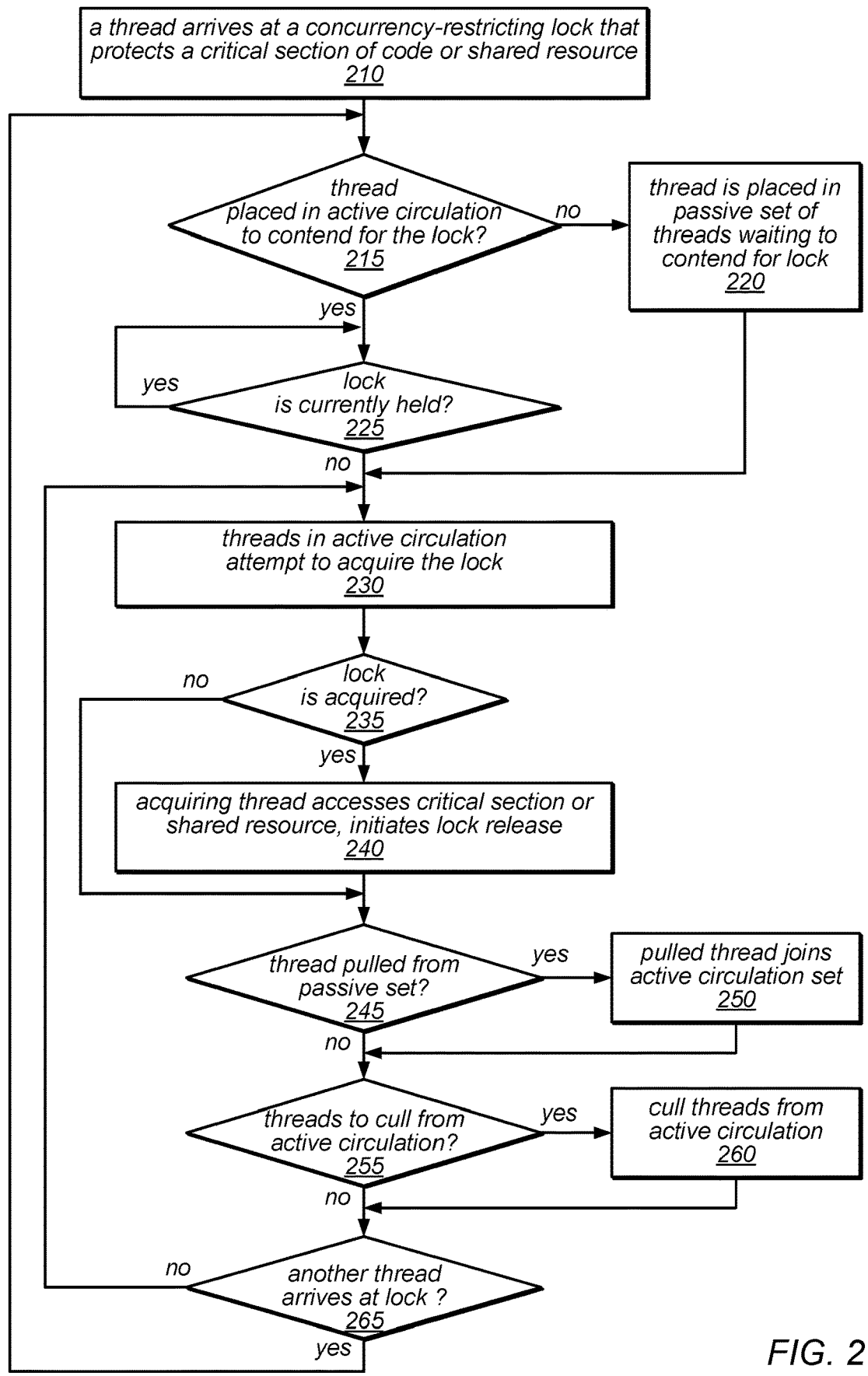
FIG. 2 is a flow diagram illustrating one embodiment of a method for restricting concurrency on a contended lock, as described herein.

One embodiment of a method for restricting concurrency on a contended lock is illustrated by the flow diagram in FIG. 2. As illustrated at 210, in this example, the method may include a thread arriving at a concurrency-restricting lock that protects a critical section of code or shared resource (e.g., by invoking an operation or process for attempting to acquire the lock). If it is determined that the thread should not be placed in the active circulation set to contend for the concurrency-restricting lock (shown as the negative exit from 215), the method may include placing the thread in passive set of threads that are waiting for the opportunity to contend for the concurrency-restricting lock, as in 220. If it is determined that the thread should be placed in the active circulation set to contend for the concurrency-restricting lock (shown as the positive exit from 215), and if the lock is currently held by another thread (shown as the positive exit from 225), the method may include waiting until the concurrency-restricting lock is no longer held before attempting to acquire it. This is illustrated in FIG. 2 by the feedback from the positive exit of 225 to its input.

As illustrated in this example, whether the thread is placed in the active circulation set for the concurrency-restricting lock or it is determined that the thread should not be placed in the active circulation set, if the lock is not currently held by another thread (shown as the negative exit from 225), the method may include one or more of the threads in the active circulation set attempt to acquire the lock, as in 230. If the lock is acquired (shown as the positive exit from 235), the method may include the acquiring thread accessing the critical section or shared resource that is protected by the concurrency-restricting lock, and then initiating the release of the concurrency-restricting lock (as in 240). As illustrated in this example, whether or not the lock is soon acquired, the method may include determining whether a thread is to be pulled from the passive set (as in 245). If so (e.g., in accordance with a long-term fairness policy), the method may include the pulled thread joining the active circulation set (as in 250). The method may also include determining whether one or more threads should be culled from the active circulation set (as in 255). If so (e.g., in accordance with a culling policy that limits the number of threads in the active circulation set and/or attempts to enforce a NUMA-aware policy for the distribution of threads in the active circulation set and the passive set), the method may include culling one or more threads from the active circulation set (as in 260).

As illustrated by the feedback from the negative exit of 265 to 230, if no other threads have arrived at the concurrency-restricting lock in the meantime, the method may include repeating the operations illustrated in elements 230-260, as threads in the active circulation set circulate over the concurrency-restricting lock (acquiring and releasing the lock one at a time). However, when and if another thread arrives at the concurrency-restricting lock (e.g., if another thread has arrived at the concurrency-restricting lock while other operations illustrated in FIG. 2 are taking place), the method may include repeating any or all of the operations illustrated in FIG. 2, as appropriate, including those illustrated in elements 215-260. While this is illustrated in FIG. 2 by the feedback from the positive exit of 265 to 215, in various embodiments, another thread may arrive at the concurrency-restricting lock any time (including, for example, while the lock is currently held, as in 225). In some embodiments, as soon as another thread arrives at the concurrency-restricting lock, it may be placed in one of the two sets of threads associated with the lock (e.g., the active circulation set or the passive set) regardless of which of the operations illustrated in FIG. 2 are currently being performed. In different embodiments, the arrival of the other thread may or may not affect the performance of any those operations that are currently in progress.

In some embodiments, the concurrency-restricting techniques described herein may be used primarily to manage the size of the active circulation set. For example, in some embodiments, concurrency restriction mechanisms may be used to cull excess threads from the active circulation set to reduce the size of the ACS (in an attempt to comply with a concurrency restriction policy). However, in some systems, the performance of the system may be dependent on the composition and "demographics" of the threads that make up the elements of the active circulation set in addition to being dependent on the size of the active circulation set. For example, in some systems, it may be desirable for the threads in the active circulation set to be equally distributed over the available cores in order to reduce unnecessary and futile competition for shared resources (e.g., pipeline resources) that could arise from an imbalanced active circulation set. Furthermore, it may be desirable for the ACS elements to be co-located on a single NUMA node to the extent possible, at least for certain periods of time, while still remaining work conserving. As described herein, this may be achieved by a NUMA-friendly concurrency-restricting lock, in some embodiments.

In various embodiments, NUMA-aware lock designs may be directed primarily to the reduction of the lock migration frequency (e.g., so as to generate better node-local locality of reference for a lock and a critical section of code or data that it protects). NUMA-aware locks may act to reduce the rate of write invalidations and coherence misses satisfied by cache-to-cache transfers from remote caches via the interconnect. In some embodiments, reducing the lock migration rate (as with the NUMA-aware concurrency-restricting locks described herein) may significantly curtail the spread of the lock metadata and critical section data across these nodes.

Figure 3:
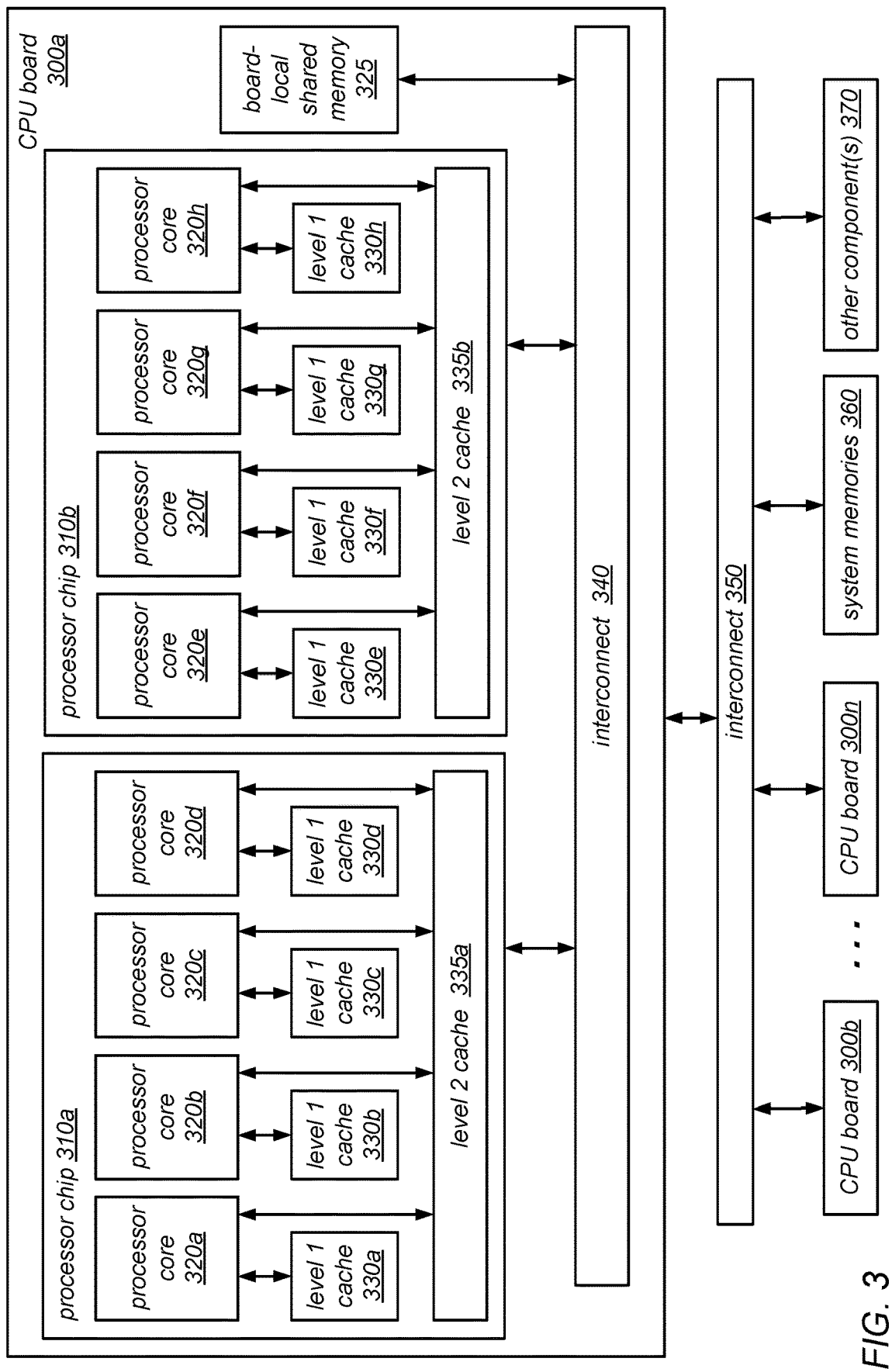
FIG. 3 is a block diagram illustrating a portion of a computer system that implements a NUMA style memory architecture, according to some embodiments.

FIG. 3 is a block diagram illustrating portion of a computer system that implements a NUMA style memory architecture, according to one embodiment. For example, the computer system illustrated in FIG. 3 includes multiple CPU boards 300 (shown as 300a-300n) that communicate with each other over interconnect 350. In this example, each of the CPU boards (which include a shared board-local memory 325) may be considered a node in the NUMA system, while in other embodiments, each node of a NUMA system may be a socket or die that includes multiple processor cores that share memory. One of these CPU boards (300a) is illustrated in more detail than the others. In some embodiments, each of the CPU boards 300 may include the same or a similar architecture as that illustrated for CPU board 300a. In other embodiments, each of the CPU boards may include a different number and/or arrangement of processor cores, caches, etc. As illustrated in FIG. 3, the computer system may also include one or more system memories 360 and/or other components 370. In this example, CPU board 300a includes two processor chips (shown as processor chips 310a and 310b) that communicate with each other and with shared memory 325 over interconnect 340. In this example, processor chips 310a and 310b include a similar architecture.

In the example illustrated in FIG. 3, processor chip 310a includes four processor cores (shown as 320a-320d), and each processor core has a respective (dedicated) level 1 (L1) cache (shown as 330a-330d). Similarly, processor chip 310b includes four processor cores (shown as 320e-320h), and each processor core has a respective (dedicated) level 1 (L1) cache (shown as 330e-330h). Each processor core may be a multi-threaded core, in some embodiments. For example, in one embodiment each processor core may be capable of concurrently executing eight hardware threads.

Inter-thread communication via local caches (e.g., L1 and L2 caches) may be significantly faster than inter-thread communication via remote caches because the latter involves cache coherence messages that are communicated across one or more of the interconnects 340 and 350. For example, the threads executing on a given processor core 320 may share the level 1 cache 330 for that processor core 320, and accesses to this level 1 cache, which may be considered local to the processor core 320 and its hardware threads, may be extremely fast. In addition, the four processor cores 320 of processor chip 310a may share the level 2 (L2) cache 335a for processor chip 310a, and accesses to this level 2 cache (by the four processor cores of processor chip 330a) may also be fast, although not as fast as those to each processor core's own level 1 cache. Similarly, the four processor cores 320 of processor chip 310b may share the level 2 (L2) cache 335b for processor chip 310b, and accesses to this level 2 cache (by the four processor cores of processor chip 310*b*) may also be fast, although not as fast as those to each processor core's own level 1 cache.

In this example, accesses to caches of a different processor chip 310 on the same CPU board 300, to caches of a processor chip 310 on a different CPU board 300, to a board-local shared memory 325 on a different CPU board 300, and/or to various system memories 360 (all of which may be considered remote accesses with respect to a hardware thread executing a particular processor core 320 of a processor chip on CPU board 300*a*) may exhibit increasingly higher latency, when compared to accesses to the level 1 and level 2 caches that are local to that hardware thread.

In some embodiments, threads executing in a NUMA system may execute critical sections that are protected by a concurrency-restricting lock (such as those described herein) and/or may access shared resources that are protected by such a concurrency-restricting lock. For example, in some embodiments, NUMA-aware concurrency restriction (which as described herein, may represent a special case of concurrency restriction) may be used to cull NUMA-distant threads from the ACS and may operate to minimize the NUMA-diversity of the ACS. In other words, while classic concurrency restriction may be concerned only with reducing the size of the ACS (while still remaining work conserving), NUMA-aware concurrency restriction may strive to reduce or minimize lock migration by actively controlling the makeup (e.g., the NUMA-diversity) of the ACS and/or the number of inter-node transitions reflected in the ACS admission order schedule (while still remaining work conserving). In some embodiments, a classic "cohort" NUMA-friendly lock may employs concurrency restriction in an attempt to restrict the ACS to one node for some period of time in order to reduce the rate of lock migration, which in turn may yield improved performance. Any of a variety of NUMA-aware locks may employ some form of concurrency restriction to control and reduce lock migration, in different embodiments. Note that, in some embodiments, both techniques may be combined. For example, in some embodiments, classic concurrency restriction may be applied to intra-node lock scheduling, while NUMA-aware concurrency restriction may be applied to inter-node lock scheduling. In at least some embodiments, the example MCSCRN and LIFON locks described below provide both classic and NUMA-aware types of concurrency restriction.

In various embodiments, the admission policy for a combined form of concurrency restriction (e.g., one that provides both classic and NUMA-aware types of concurrency restriction) may specify the following:

A. Given a sufficient number of participating threads, and for short episodes, membership in the ACS should be restricted to threads that originated from the currently preferred NUMA node. In this case, the policy may act to "homogenize" the ACS with respect to NUMA diversity. This may also act to reduce lock migration, which in turn may improve aggregate throughput over the lock. Note that restricting membership in the ACS to threads that originated from the currently preferred NUMA node for longer episodes may increase performance, but may sacrifice short-term fairness.

B. Given (A) and a NUMA "homogenized" ACS, the maximum size of the ACS should be limited to the minimum number of threads needed to saturate the lock, and any surplus threads should be passivated (e.g., placed in the passive set).

In addition to controlling the demographic composition of the ACS, an ideal NUMA-aware concurrency-restricting lock implementation may also strive to minimize the number of NUMA node transition edges in the ACS admission schedule.

It should be noted that the peak throughput of a system may appear at a thread count below the lock's saturation level. In these cases, concurrency restriction (CR) techniques may provide neither harm nor benefit, as the collapse point and the saturation point are unrelated. However, peak throughput may never occur beyond (e.g., at a higher thread count than) the lock's saturation point. The scalability collapse phenomena generally involves competition for shared hardware resources. A classic example is residency in a shared cache. As more threads circulate over a lock in unit time, more pressure is put on the cache and miss rates increase. Critically, as the cache is shared, the residency of the data accessed by a thread decays over time due to the action of other concurrently running threads that share that cache. In some embodiments of the systems described herein, by reducing the number of threads that are circulating, cache pressure may be reduced and residency may be retained for longer periods, thus reducing the miss rate. In other words, concurrency restriction, as described herein, may reduce destructive interference in shared caches. Note that when this interference results in cache misses, then there may be increased contention for the channels to and from main memory (e.g., from DRAMs making up main memory). Thus, when cache misses are reduced through concurrency restriction, DRAM channel congestion and competition for the bandwidth of those channels may also be reduced.

More specifically, with a sufficiently large number of threads circulating over a contented lock, the overall throughput of an application may become dominated solely by the duration of the critical section protected by the lock. Note that, in the examples described herein, it may be assumed that actions taken in the critical section exhibit locality and that the non-critical sections access thread-private data. Furthermore, it may be presumed that critical section invocations under the same lock exhibit reference similarity. Therefore, acquiring lock L may be a good predictor that the critical section protected by L will access data that was accessed by recent prior critical sections protected by L (i.e., critical section invocations tend to access data accessed by prior critical section invocations). The actions taken by concurrent threads in the non-critical section may tend to erode the last level cache (LLC) residency of the critical section data. If the ACS is large, the eviction pressure on the critical section data by multiple non-critical section instances may become more intense. In turn, the critical section may incur more misses in the LLC, the critical section duration may increase, and, consequently, throughput may drop. On the other hand, by minimizing the ACS, aggregate throughput may be increased. Again note that by minimizing the LLC miss rate, contention on the DRAM channels may also be reduced.

In one example, a database application in which each critical section operation accesses a record in a large (e.g., 2 MB) customer database may execute on a single-socket processor that includes an 8 MB shared LLC. In this example, each individual critical section may access only one record, but over time most records will be accessed repeatedly by subsequent operations. In other words, the critical section itself may be "short" in terms of its average duration but its repeated execution may have a wide impact in the sense that a set of critical section invocations will eventually touch all 2 MB in the database. In this example, there are 16 threads, but the (NCS+CS)/CS ratio may be such that only five threads are needed to fully saturate the lock and provision the ACS. Furthermore, the non-critical section "footprint" of each thread is 1 MB. In this example, even though an individual non-critical section invocation may be short, over time, a thread may access all 1 MB of its thread-private data. In this example, as described above, the critical section data may be shared data, while the non-critical section data may be per-thread data that is thread-private.

In this example, under a classic FIFO MCS type lock, all 16 threads will circulate over the lock in round-robin cyclic order. Therefore, the total footprint would be 18 MB, which includes 16 threads times 1 MB/thread for the non-critical sections (for a total of 16 MB) plus 2 MB for the critical section. This 18 MB footprint clearly exceeds the 8 MB capacity of the LLC. Therefore, the non-critical section operations will erode and decay the LLC cache residency of the critical section data. That will slow down the execution of the critical section, and degrade overall throughput. However, if the system employs the concurrency restriction techniques described herein, the lock subsystem may be able to limit the size of the ACS. For example, if the size of the ACS is set at five threads, the total footprint would be 7 MB, which includes 5 threads times 1 MB/thread for the non-critical sections (for a total of 5 MB) plus 2 MB for the critical section. In this mode, the total footprint (e.g., the critical section data plus the non-critical section data of the ACS threads) would fit comfortably within the LLC. Consequently, the non-critical section instances may not erode the critical section data LLC residency, the critical section may not suffer from misses arising from destructive interference in the LLC, and throughput may be improved. In other words, the techniques described in detail herein may reduce cache pressure, and more specifically pressure on the critical section data, which is often critical for throughput.

Another shared resource that may be conserved via concurrency restriction, such as that described herein, is per-chip thermal and energy limits. For example, in systems that employ facility based on running average power limiting to cap energy, the use of concurrency restriction may yield better performance. In systems that are uncapped, the use of concurrency-restricting techniques may also reduce energy use while still providing improved performance, in that concurrency restriction may act to maximize the performance per joule.

In some embodiments, concurrency restriction may reduce the competition for logical CPUs or shared pipelines. For example, a core may have a lot of pipelined resources, and if there is only one thread running on the core, all those resources can work together to make that one thread run very fast. However, when there are multiple threads on the core, the hardware will start divvying up the pipeline resources more and more, and each of the threads may run more slowly. At some point, without concurrency restriction, threads may be waiting around starved for a cycle start (for a pipeline resource).

In some embodiments, including many of those described herein, lock saturation levels may be used to control concurrency restriction. In other embodiments, however, it may be possible to use hardware performance counters to measure competition for shared resources. In one example, a counter that reflects the number of cycles logical CPUs stalled waiting for pipelines may provide a metric for being "cycle bound", in which case a concurrency-restricting lock implementation may act to more aggressively throttle concurrency. Similarly, concurrency restriction may be imposed when thermal throttling is active, in some embodiments. For example, a multi-core processor that allows up to 64 threads may actually have a thermal bound that means it can only support sixteen threads or fewer simultaneously. When that thermal bound is exceeded, the processor may start overheating and, recognizing that it is overheating, may throttle down the clock rate. In this example, the concurrency restriction techniques described herein may be used to avoid a situation in which the processor overheats and/or reduces the clock rate.

In some embodiments, concurrency restriction may act to reduce voluntary context switch rates. For example, context switches are typically expensive, e.g., with latency worse than 10000 cycles. They may reflect wasted administrative work (e.g., co-ordination overhead) that does not directly contribute toward forward progress of the executing application(s). In some embodiments, since the passive set can remain stable for some period, threads in the passive set may incur less context switching, which in turn means that the CPUs on which those threads were running may be eligible to use deeper sleep states and enjoy reduced power consumption and more thermal headroom for turbo mode. Note that, generally, the deeper the sleep state, the more power is conserved while in that state, but the longer it takes for the CPU to enter and exit that state. For example, to support a default Linux kernel idle policy called the "ladder" scheme, a module may force CPUs into deeper sleep states based on how long the CPU has been idle. Deeper sleep states may consume significantly less power, but a CPU at a deeper state may also take far longer to exit that state and resume normal execution, as would happen when a thread is made ready and dispatched onto an idle and available CPU.

In some embodiments, by minimizing the size of the ACS, the set of CPUs hosting the ACS threads may be fully utilized (e.g., these CPUs may not become idle, and thus may not incur latency exiting deeper sleep states). Furthermore, other CPUs not hosting ACS threads may enjoy longer idle periods and deeper sleep states, thus improving energy consumption and, potentially, making more thermal headroom available for other unrelated threads, or allowing members of the ACS to run at higher clock rates.

Conversely, if concurrency restriction is not used, then the ACS may be larger. In this case, lock ownership can circulate over a larger number of threads (CPUs) in a given period. Some of those threads may wait by blocking in the kernel, potentially making their CPUs become idle. Rapid circulation of the lock over this larger ACS may cause CPUs to shift between idle and non-idle more rapidly, both incurring latency in the idle to non-idle transition, and also prohibiting the CPUS underlying the ACS from reaching deeper energy-saving sleep states.

As noted above, the concurrency-restricting locks described herein may maintain threads in an active circulation set and a passive set. In various embodiments in which the concurrency-restricting lock is NUMA-oblivious (e.g., not NUMA-aware), the initial placement of threads in the active circulation set may be random or may be determined on a first-come-first served basis. Note that a random initial partitioning of may be acceptable or even be desirable, and may allow the system to, eventually, sort itself out, especially in embodiments in which one or more local or long-term fairness policies are imposed from time to time (e.g., policies that result in moving threads from the active circulation set to the passive set and vice versa). As described in more detail herein, these fairness policies (which may cause culling operations to move threads from the active circulation set to the passive set or may promote threads from the passive set to the active circulation set) may determine which threads are moved randomly (based on a Bernoulli trial) or based on other criteria. For example, a decision about when to extract a thread from one of the sets and/or about which thread to extract may, in different embodiments be based on which threads or nodes have or have not been active lately, on a counter value or a length of time (e.g., how long threads have been waiting on the passive set, or how many times threads in the active set have jumped in front of those on the passive set).

One of the techniques employed by the concurrency-restricting locks described herein may be a parking techniques (or a pair of operations to park( ) and unpark( ) a given thread.) In general a parking operation may quiesce or passivate the calling thread and voluntarily surrender the CPU on which the caller was executing, making that CPU immediately available to run other ready threads. If no other threads are ready, then the CPU may become idle and be able to drop to lower power states. In some embodiments, this may reduce power consumption and may enable other threads on the same chip to run at faster speeds via turbo-mode.

Note that park( ) may, in some cases, admit spurious returns. One test of proper and safe park-unpark usage may be to consider the degenerate but legal implementation where park( ) and unpark( ) are implemented as no-ops, in which case the algorithms that use park-unpark would simply degenerate to spinning. This reflects a legal but poor quality implementation. After returning from a park( ) call, the caller is expected to re-evaluate the conditions related to waiting. In this example, a park-unpark pair may be thought of as an optimized from of busy-waiting or polling. Specifically, control returning from park( ) may not imply a corresponding previous unpark( ) operation. By allowing spurious wakeups, a system may afford more latitude to the park-unpark implementation, possibly enabling useful performance optimizations. Note that, given the point-to-point nature in which thread A directly unparks and wakes B, using park-unpark for a lock may require the lock algorithm to maintain an explicit list of waiting threads.

In some embodiments, optimized park-unpark implementations may be able to avoid calling into the kernel. For example, if a thread S calls unpark(T) where T is not currently parked, the unpark(T) operation may record the available "permit" in T's thread structure and return immediately without calling into the kernel. When T eventually calls park( ) it may clear that permit flag and return immediately, again without calling into the kernel. Redundant unpark(T) operations (in which a waiting thread T has previously been unparked but has not yet resumed) may also include an optimized fast path to avoid calling into the kernel, in some embodiments. Note that park( ) may be augmented with a timed variation that returns either when the corresponding thread is unparked or when a predetermined time duration is exceeded.

In at least some embodiments of the systems described herein, the operating system kernel scheduler may provide three states for threads: running, ready, and blocked. The running state indicates that the thread is active on a processor. The ready state indicates that the thread is eligible to run, but has not been dispatched onto a processor. The blocked state indicates that the thread is suspended and ineligible for dispatch and execution. In some of the examples described herein, the terms "sleeping" or "waiting" may be equivalent to being in a "blocked" state. In at least some embodiments, park( ) may transition a running thread to the blocked state and unpark( ) may transition a blocked thread to the ready state. The kernel may, typically, manage all ready-running transitions, while the lock subsystem, via park-unpark, may controls the ready-blocked transitions. For example, the kernel scheduler's "dispatch" function may shift a thread from ready to running. Involuntary preemption via time-slicing may shift a thread from the running state to the ready state. In general, park( ) may be thought of as causing a thread to "sleep" and unpark( ) may be thought of as waking or resuming that thread, re-enabling the thread for subsequent dispatch onto a processor. In some embodiments, a parked thread may be waiting for some event to occur, and notification of that event may occur via a corresponding consequent unpark( ).

In some embodiments, preemption may be controlled by the kernel and may reflect an involuntary context switch. The victim is changed from the running state to the ready state and some other ready thread may be dispatched on the CPU and made to run. In some embodiments, preemption may be trigged by timer interrupts. Typically, the kernel may resort to preemption when there are more runnable threads than CPUs. For example, the kernel may preempt one thread T running on CPU C in order to allow some other ready thread a chance to run on C. Preemption may provide long-term fairness over the set of runnable threads competing for the CPUs. That is, the kernel may use preemption to multiplex M threads over N CPUs, where M>N. After a thread is made ready, it may receive a time slice (quantum). When the quantum expires, the thread may be preempted in favor of some ready thread. As previously noted, threads that have been preempted may be in the ready state. In some embodiments of the systems described herein, concurrency restriction techniques may act to reduce preemption rates by reducing the number of ready threads competing for available CPUs. Recall that preemption is wasted "administrative" overhead and does not contribute to the forward progress of application threads. Furthermore, preemption may inadvertently preempt the lock holder, resulting in a so-called "convoy phenomena".

In some embodiments, optimized Park( ) implementations may spin briefly before reverting to blocking in the kernel. The spin period may be brief and bounded, and may act to reduce the rate of expensive and potentially unscalable calls into the kernel to perform ready-blocked state transitions. This may be referred to as a spin-then-block waiting policy. As described herein, the spin period may reflect local spinning and may be implemented with a "polite" busy-wait loop or via MONITOR-MWAIT instructions.

In some embodiments, waiting in the kernel via blocking or via a MONITOR-MWAIT mechanism targeting a thread-private local variable may free up pipeline resources or bring the CPU under thermal-energy caps, which in turn may accelerate the progress of the lock owner, increasing scalability. Note that if the lock is contended and fully saturated, throughput may be completely determined by the critical section duration. By potentially accelerating the lock owner, the critical section duration and lock hold time may be reduced.

In some embodiments, in order to help reduce handover latency, an "anticipatory warm-up" may be employed, as follows. If it is expect that a call to unpark( ) thread T will be made in the near future and if T is blocked in the kernel, thread T may be preemptively unparked so that T becomes ready and starts spinning. An Unpark(T) operation may impose considerable latency in the caller because of the need to invoke kernel operations. In some embodiments, an anticipatory unpark(T) may be executed only while the caller does not hold the lock for which T waits, otherwise the system may risk artificially increasing the critical section length and impacting throughput over the contented lock. Anticipatory unpark( ) operations may be particularly well suited for locks that use succession by direct handoff, and may act to increase the odds that an unlock( ) operation will transfer control to a thread that is spinning, instead of to a thread that is blocked in the kernel. This optimization (which is optional) may help to reduce lock handover latency.

The concurrency-restricting lock described herein may, in different embodiments, employ any of a variety of succession and waiting strategies. For example, the concurrency-restricting lock algorithms may provide succession either by direct handoff (in which ownership of the lock is conveyed directly from the current owner to some waiting thread) or via so-called competitive succession (in which the current owner, in unlock( ) releases the lock and allows waiting threads to contend for the lock) Direct handoff may perform better under high contention, while competitive succession is more optimistic and may reduce succession latency in conditions of light contention. To provide progress and liveness, locks that use competitive succession may need to unpark an "heir presumptive" thread that had been waiting. The heir presumptive may then compete for the lock.

In some systems, and under certain conditions, locks that employ direct handoff succession may exhibit any or all of the following performance issues: A) If the successor has been involuntarily preempted, then the lock might hand off ownership to a de-scheduled thread T. In this case, T may be either ready but not running, or may itself be blocked and waiting on some other resource. This may result in the so-called "convoying" phenomena with transitive waiting (which is sometimes referred to as "head of line blocking"). B) If the successor has de-scheduled itself (e.g., via voluntary park( ) calls), it may need to be awakened via unpark( ) This may be accomplished via calls into the operating system kernel to make the thread eligible for dispatch. The time from an unpark( ) until the corresponding park( ) calls returns may be very high because of overheads in the operating system. As previously noted, latencies of 10000 cycles or more may be typical. This lock handover latency greatly impacts throughput over the contented lock, and can dominate performance under contention.

In some embodiments, spin-then-park waiting strategies may provide some relief from context switching costs. However, spin-then-park strategies may not work well with strict FIFO queue-based locks. With these types of locks, the next thread to be granted the lock may also be the one that has waited the longest, and is thus most likely to have exceeded its spin duration and reverted to parking. Conversely, the most recently arrived threads may be the most likely to still be spinning, but they will be the last to be granted the lock.

Note that all lock implementations that use local spinning also use direct handoff, including, for example, list-based queuing locks in which threads contending for the lock are maintained in a linked list and spin on local variables, such as the locks described by John Mellor-Crummy and Michael Scott (and which are sometimes referred to herein as "MCS locks"). In addition, all strict FIFO locks use direct handoff. As noted above, direct handoff is generally unsuitable for locks that wait via parking. Park-unpark and waiting via local spinning typically require the lock algorithm to maintain explicit lists of waiting threads. A simple TATAS lock (e.g., polite test-and-test-and-set lock) may employ competitive succession, and in comparison, may require no such list be maintained, as the set of waiting threads is implicit.

In the discussions included herein, lock handover latency may be described as follows. If thread A holds lock L, thread B waits for lock L, and thread B is the next thread to acquire ownership when thread A releases L, the handover latency is the time between thread A's call to unlock( ) and the time at which thread B returns from lock( ) and can enter the critical section. Handover latency (which is sometimes called "responsiveness" in the literature) may reflect the overhead required to convey ownership from A to B. Excessive handover latency increases latency and degrades scalability. For example, if A must unpark( ) B via calls into the kernel to transition B from blocked to ready, then the handover latency increases significantly. In some embodiments, the concurrency-restricting lock implementations described herein may attempt to minimize handover latency.

The manner in which a thread waits for lock may be referred to as the waiting policy. Any of a variety of waiting policies may be employed in the concurrency-restricting locks described herein including, in different embodiments, any of the policies described below. One example waiting policy is to use parking (as described above). Parking vacates the processor, allowing other threads to run. Unfortunately operating system level context switching costs may be prohibitive when employing this approach. Another example waiting policy is to use pure unbounded spinning. Note that both simple TATAS locks and classic MCS type locks use unbounded spinning. While unbounded spinning often appears in academic literature, it is generally avoided in actual software. For example, although it may be convenient and simple, unbounded spinning can interfere with the performance of other threads on the system. In addition, spinning occupies a processor, possibly prohibiting some other ready thread from running. Eventually, involuntary preemption by the operating system will de-schedule the spinner and allow other ready threads to run, but quanta (each time slice) can be relatively long. Therefore, depending on preemption may not be prudent and may result in particularly poor performance when the number of ready thread exceeds the number of available processors.

Another example waiting policy is a spin-then-park approach. Under this policy, threads may spin for a brief period (e.g., optimistically waiting) in anticipation of a corresponding unpark operation. Then, if no unpark has occurred, they may revert to parking, as necessary. Under this policy, the spin period (which constitutes local spinning) may be set to the length of a context-switch round trip. More precisely, a thread may spins until I steps have passed or until a corresponding unpark occurs. In this example, I can be expressed in either units of wall-clock time or in a number iterations of a spin loop. If no unpark occurs within the period bounded by I, the thread may de-schedules itself by parking.

In some embodiments, when using a spin-then-park waiting, policy, the spin phase may be augmented with a technique sometimes referred to as "inverted schedctl usage". This technique may involve the use of a schedctl instruction (which allows a thread to request that involuntary preemption be deferred for a brief period) to cover the spin phase of a spin-then wait mechanism, rather than to cover the critical section (which is the way it is typically used). In addition, the schedctl interface may allow one thread to efficiently to query the kernel scheduling status (e.g., running, ready, or blocked) of any other thread. For example, with MCS type locks, or more generally any lock with succession by direct handoff, a thread U releasing the lock can inspect the schedctl status of the intended successor. For MCS type locks, if the successor S is ready or blocked, then the successor is not spinning and transfer of ownership would entail considerable lock handover latencies. In that case, the thread U calling unlock may optionally edit the MCS chain to excise the successor and favor handoff to some other thread T on the MCS chain that is spinning (running). The excised thread S may be placed on a special "standby" list. After U transferred ownership of the lock to T, it may then try to wake S to prepare S to eventually receive ownership of the lock. Note that absent such a schedctl instruction, a protocol may be instituted in which threads in park( ) indicate (e.g., via status variables) if they are spinning or blocked in the kernel. Again, in order to reduce lock handover latency, the succession policy may favor transferring ownership to a thread that is spinning over a thread that is blocked in the kernel. In some embodiments, the schedctl approach may make it possible to detect the case in which a thread that was spinning was preempted by the kernel.

Another example of a waiting policy is one that uses MONITOR-MWAIT instructions. These instructions (or similar instruction pairs), which are present on many modern processors, allow a thread to wait politely for a location to change. While waiting, the thread still occupies a CPU, but MWAIT allows the CPU to go into deeper sleep states. In some embodiments, hardware transactional memory may be used to wait politely. Normally, MWAIT may be inappropriate for global spinning with a large number of threads. However, the concurrency-restricting approaches described herein may constrain the number of threads spinning on a given lock at any moment, making MWAIT a viable option for the locks described herein.

Note that, in general, a lock scheduling policy may be considered to be "work conserving" if the following invariant holds: if any waiting thread can be admitted, then one such thread will be admitted. More precisely, a lock may be considered to be work conserving if it is never the case that: (a) the lock is unheld, and, (b) there are waiting threads, and (c) none of those threads have been enabled for entry. In practice, for a lock that uses succession by direct handoff, if there are waiting threads at the point when the lock is released, then ownership of the lock will be immediately conveyed to one of those thread waiting threads. In the context of the concurrency-restricting locks described herein, the work conserving property means that the admission policies may never under-provision the active circulation set (ACS). If the ACS needs to be re-provisioned or expanded by transferring an element from the passive set into ACS, then it is done immediately. This may avoid "dead time" during which the lock is not held, but waiting threads could otherwise be allowed admission.

Note that in the example implementations described herein, a "free range" threading model, in which the operating system is free to migrate threads between processors and nodes in order to balance load or achieve other scheduling goals, may be assumed. In addition, it is expected that migration (since it is relatively expensive) will be relatively rare.

Example Concurrency-Restricting Locks

The concurrency restriction techniques described above may be applied to create concurrency-restricting locks from a wide variety of existing locks, in different embodiments. Several non-limiting examples of concurrency-restricting locks that are based on existing locks are described in detail below. The first of these examples is an outer-inner dual path lock (sometimes referred to herein as an OIL lock) that provides concurrency restriction. In this example, the concurrency-restricting lock includes an outer lock, an inner lock, and a field (referred to herein as the "IOwner" field) that indicates which thread owns the inner lock. The concurrency-restricting OIL lock is considered to be held by a thread only if and only if that thread holds the outer lock. In this example, the outer lock may, in a sense, be considered the fast path for acquisition of the OIL lock, where the threads in the active circulation set circulate and will move through the outer lock. On the other hand, the inner lock, where threads are put in the passive set, may be considered the slow path for acquisition of the OIL lock. The threads on the passive list wedge up against the inner lock, each hoping to acquire it and, in at least some cases, to be granted an opportunity to contend for the outer lock if they are successful.

As described in more detail below, when a given thread first arrives at the OIL lock, it may (optimistically) attempt to acquire the outer lock. If it is successful, it may return from its operation to acquire the lock as the OIL lock owner and may proceed to access the critical section of code or other shared resource that is protected by the OIL lock. If the given thread is not able to obtain the outer lock, it may spin or wait briefly (e.g., for 1000 cycles, or for some other predetermined number of cycles or amount of time) and may try again to acquire the outer lock. If, after a small number of attempts (with the same or different amounts of spinning/waiting in between), the given thread may give up and move on to the inner lock, joining the passive set of threads that are contending for the inner lock.

In this example, once the given thread, or another thread in the passive set, acquires the inner lock, it may take on a special status as the only one of the threads in the passive set to be able to contend for the outer lock. For example, if there are ten threads contending for the inner lock, one of them (the inner lock owner) may be thought of as being poised between the active circulation set (threads of which contend for the outer lock) and the passive set (threads of which contend for the inner lock). After acquiring the inner lock, the inner lock owner may, from time to time, attempt to acquire the outer lock. If the inner lock owner acquires the outer lock, it may return from its operation to acquire the lock as the OIL lock owner and may proceed to access the critical section of code or other shared resource that is protected by the OIL lock. In some embodiments, when and if the inner lock holder (i.e., the inner lock owner) acquires the outer lock, another thread in the passive set may acquire the inner lock.

Note, however, that it may not be desirable for the inner lock holder to acquire the outer lock too quickly (or too often), as this may result in frequent intermixing between the active circulation set and the passive set (thus defeating the purpose of partitioning incoming threads into two separate sets of threads in order to restrict concurrency). Therefore, in some embodiments, the inner lock holder may only attempt to acquire the outer lock occasionally and/or only after a predetermined or randomized period of waiting or spinning following the acquisition of the inner lock or following a determination by the inner lock holder that the outer lock is not held. For example, rather than the inner lock holder spinning on the outer lock in an attempt to quickly acquire the outer lock, it may perform what may be referred to as "anti-spinning" prior to attempting to acquire the outer lock. In this example, the inner lock holder may spin or wait for some period of time after acquiring the inner lock (or after determining that the outer lock is not held) before attempting to acquire the outer lock (e.g., in order to avoid acquiring the outer lock too quickly). If, after the inner lock holder spins or waits for a brief period, and in order to make progress, the inner lock holder determines that the outer lock is (still) not held, the inner lock holder may attempt to acquire the outer lock (contending with the threads in the active circulation set for ownership of the outer lock).

Figure 4A:
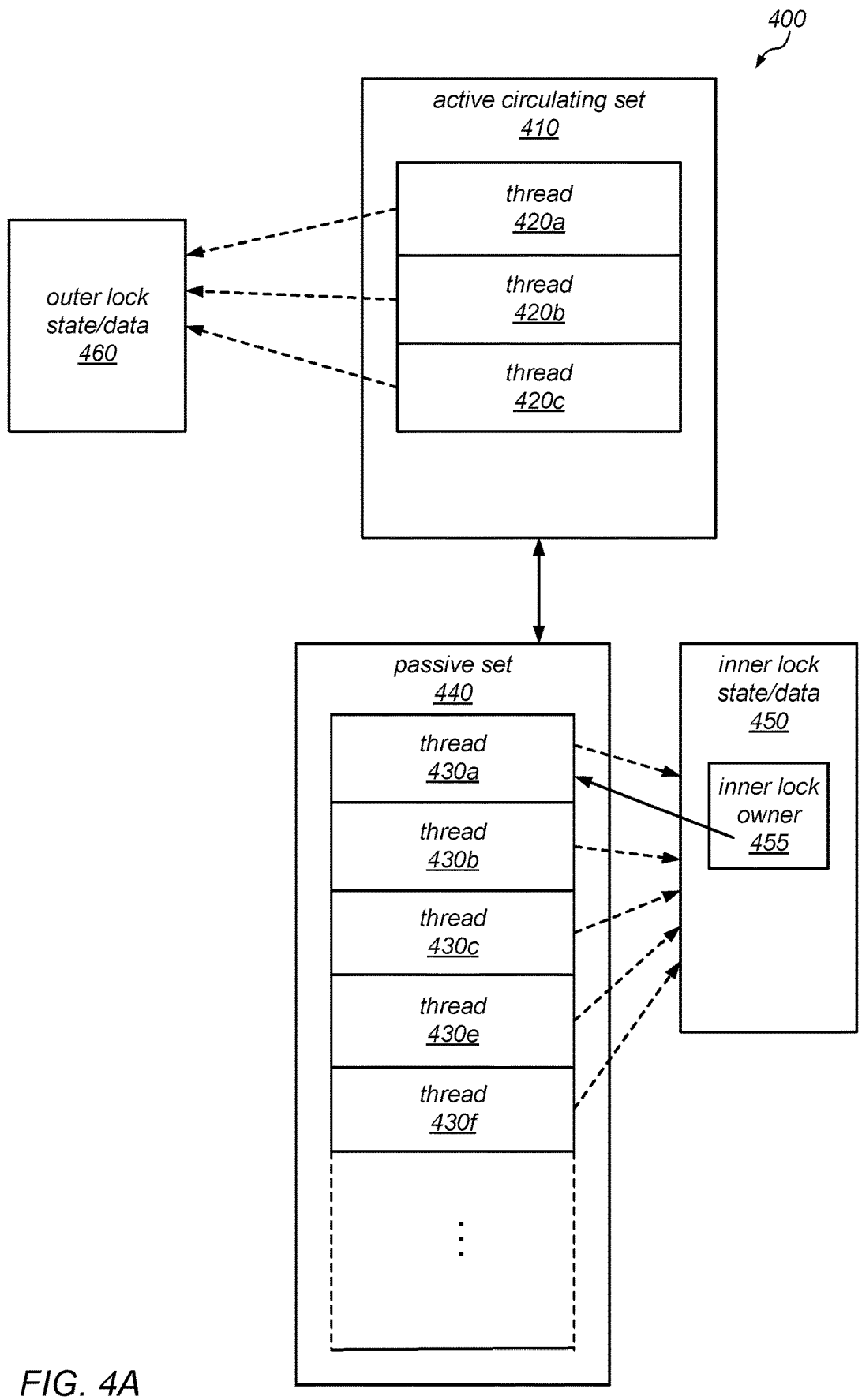
FIGS. 4A and 4B are block diagrams illustrating one embodiment of an outer-inner dual path lock.
Figure 4B:
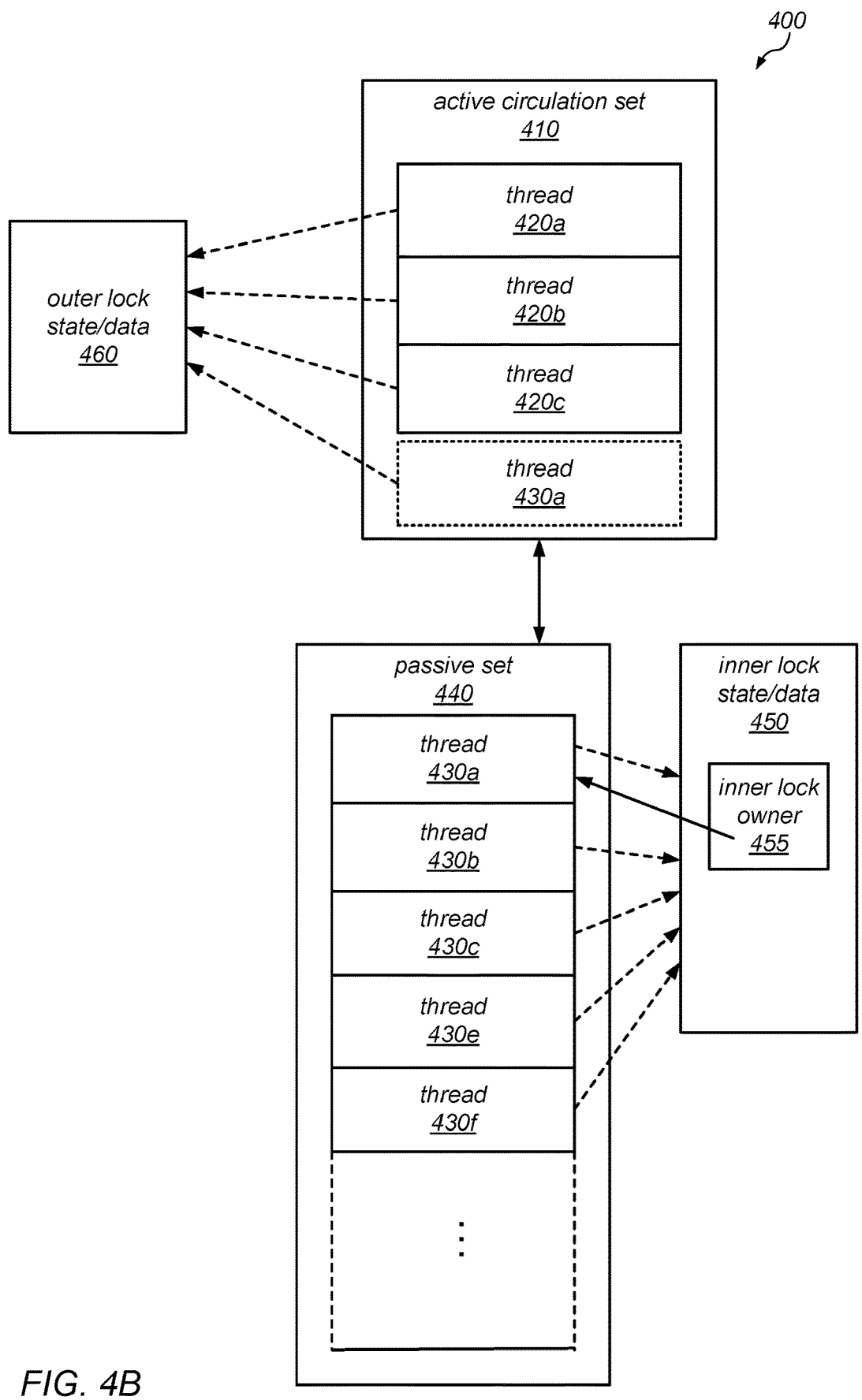

One embodiment of an outer-inner dual path lock (e.g., which is a type of concurrency-restricting lock) is illustrated by the block diagrams in FIGS. 4A and 4B. In this example, the outer-inner dual path lock 400 illustrated in FIG. 4A (which may, in different embodiments, protect a critical section of code in a multithreaded application or a shared resource accessed by multiple threads of a multithreaded application) includes a data structure 460 that stores data representing the lock state and/or other data associated with an outer lock (e.g., metadata representing the lock owner or preferred/home node, a pointer to a successor for lock ownership, or other information), a data structure 450 that stores data representing the lock state and/or other data associated with an inner lock (e.g., metadata representing the lock owner, shown as 455, metadata representing a preferred/home node, a pointer to a successor for lock ownership, or other information), a data structure 410 representing an active circulation set (e.g., a set of threads that circulate over the outer lock, contending for lock ownership of the outer-inner dual path lock), and a data structure 440 representing a passive set (e.g., a set of threads that are waiting for an opportunity to contend for ownership of the outer-inner dual path lock).

In this example, outer-inner dual path lock 400 may be considered to be held only when (and if) the outer lock is held. In other words, a thread holds the outer-inner dual path lock if and only if that thread holds the outer lock (regardless of whether or not it also holds the inner lock). In one example embodiment, described in more detail below, the outer lock may be a test-and-test-and-set lock and the inner lock may be a list-based queuing lock in which threads contending for the inner lock are maintained in a linked list and spin on local variables (e.g., an MCS type lock).

As illustrated in this example, a data structure representing the active circulation set (such as data structure 410) may maintain data representing multiple threads that (as indicated by the dashed lines from the elements 420a-420c to outer lock state/data 460) are currently contending for ownership of the outer lock in order to acquire the outer-inner dual path lock (e.g., lock 400). As illustrated in this example, a data structure representing the passive set (such as data structure 440) may maintain data representing multiple threads that, in general, are not currently able to contend for ownership of the outer-inner dual path lock (e.g., at least elements 430a-430f), but that contend for the inner lock. This is illustrated in FIG. 4A by the dashed lines between elements 430a-430f and inner lock state/data 450.

As illustrated by the bi-directional line between active circulation set 410 and passive set 440, and described in detail herein, in various embodiments, threads that are part of an active circulation set for a concurrency-restricting lock may be culled from the active circulation set and placed in the passive set (thus limiting the number of threads in active circulation) and/or threads that are part of the passive set for a concurrency-restricting lock may be promoted to the active circulation set (thus being afforded an opportunity to contend for the concurrency-restricting lock and increasing long-term fairness with respect to lock ownership). In the example outer-inner dual path lock illustrated in FIG. 4A, a thread that successfully acquires the inner lock (unlike any other threads in the passive set) may be able to contend (along with the threads in the active circulation set) for the outer lock. In some embodiments, rather than explicitly joining the active circulation set upon acquiring the inner lock, the thread that holds the inner lock may, every once in a while (e.g., periodically or in response to various triggers), check the status of the outer lock. In some embodiments, if the thread that holds the inner lock finds that the outer lock is not currently held, it may briefly spin or wait (e.g., using an "anti-spinning" mechanism, several examples of which are described herein) before attempting (one or more times, with or without additional spinning or waiting in between) to acquire the outer lock. Once the thread that holds the inner lock acquires the outer lock, it may join the active circulation set. For example, data representing that thread may be moved from passive set 440 to active circulation set 410.

In this example, thread 430a has acquired the inner lock, as indicated by the pointer from the inner lock owner field 455 of inner lock state/data 450. Therefore, thread 430a may, once in a while, contend for the outer lock, along with threads 420a-420e. This is illustrated in FIG. 4B, which depicts thread 420a (with a dashed outline) within active circulation set 410 (as if it were actually a member of the set of threads in the active circulation set), and contending for the outer lock 460 (as indicated by the dashed line from the element representing thread 430a in active circulation set 410 and outer lock 460). FIG. 4B also depicts thread 420a (with a solid outline) within passive set 440 since, at this point, thread 420a has not yet been promoted from being a member of passive set 440 to being a member of active circulation set 410. However, in some embodiments, when and if thread 430a acquires the outer lock, it may access the critical section of code or shared resource that is protected by the outer-inner dual path lock 400, after which it may be promoted to active circulation set 410 and may release both the inner lock (e.g., by modifying inner lock state/data 450) and the outer lock (e.g., by modifying outer lock state/data 460).

In one embodiment of the outer-inner dual path lock described above, the inner lock may be an MCS lock, and the outer lock may be a simple test-and-test-and-set (TATAS) spin lock. Test-and-test-and-set locks use competitive succession and offer excellent lock handover latency under no contention or light contention. With these locks, the set of contending threads is implicit and no list of waiting threads needs to be maintained. However, under high contention, the performance of these locks may suffer for any or all of the following reasons: 1) They can generate considerable futile coherence traffic while threads are polling the lock. This may be referred to as "global spinning". Note that other locks (such as MCS locks) may instead use local spinning, such that at most one thread is spinning on a given location at any instant. 2) If a group of N threads are busy-waiting on a TATAS lock when the lock is released by the owner, all N threads may "pounce" simultaneously and try to acquire the lock with an expensive atomic instruction that forces the cache line underlying the lock word into M-state, incurring yet more coherence traffic. In this scenario, N−1 threads will fail and one thread will acquire the lock.

In some embodiments, e.g., in order to avoid the two issues described above, TATAS locks may employ randomized exponential back-off between a given thread's attempts to acquire the lock. Back-off is anti-FIFO and deeply unfair, however. In addition, a policy of applying such back-offs is also not strictly work conserving. The use of longer back-off periods can reduce coherence traffic from polling, but such long periods may also increase hand-over latency. Somewhat perversely, the anti-FIFO property of TATAS locks can be useful for overall performance. For example, freshly arrived threads may probe more aggressively (e.g., at a higher rate) and may thus be more likely to acquire the lock in any given period. Those freshly arrived threads may also have better residency in shared caches, while threads that have waited longer may have had their residency degraded and decayed by the actions of other concurrent threads. Note that the waiting threads have not been able to make progress, accessing their data and maintaining their residency.

In some embodiments, the fairness of a TATAS lock may be tightly tied to the underlying hardware cache arbitration polices of the system and/or its processor cores. In practice, TATAS locks are often deeply unfair because of various hardware properties. For example, threads "near" the previous owner may enjoy some timing advantage in noticing that the lock has been dropped (or is being dropped). However, this may be undesirable, as it may mean that a given lock may behave differently over a set of different hardware platforms. In many cases, the branch predictors in TATAS loops may be trained in the wrong direction, causing branch misprediction stalls at inopportune times, such as when the lock has been observed to be "free" or just after the lock has been acquired. Despite those issues, a TATAS lock may be appropriate for the outer lock in an OIL construct. For example, this approach may reduce contention on the outer lock to such a degree that the issues above are irrelevant, and the system may still benefit from the efficient lock handover performance conferred by TATAS locks.

In some embodiments, most of the contention for an OIL lock may be diverted to the inner lock on the slow path. In one embodiment, for example, the inner lock may be a derivative of an MCS lock, which may be able to gracefully tolerate high contention. In some embodiments, all potentially expensive operations on the inner lock may occur when a thread does not hold the outer lock. This may avoid artificially increasing the critical section duration (and thus, the lock hold time) for the purposes of performing administrative actions on the lock, such as queue manipulation. In order to minimize the hold time, the amount of lock-related overheads that occur within the critical section may be minimized.

In some embodiments, the "OIL" transformation described herein may allow a lock such as an MCS lock, which uses direct handoff, to be converted into a composite form that allows barging. More specifically, the new construct may use direct handoff for threads in the slow contention path, but may allow competitive succession for threads circulating outside the slow path. The resultant composite "OIL" lock may thus enjoy the benefits of both direct handoff and competitive succession, while mitigating the undesirable aspects of each of those policies.

Figure 5:
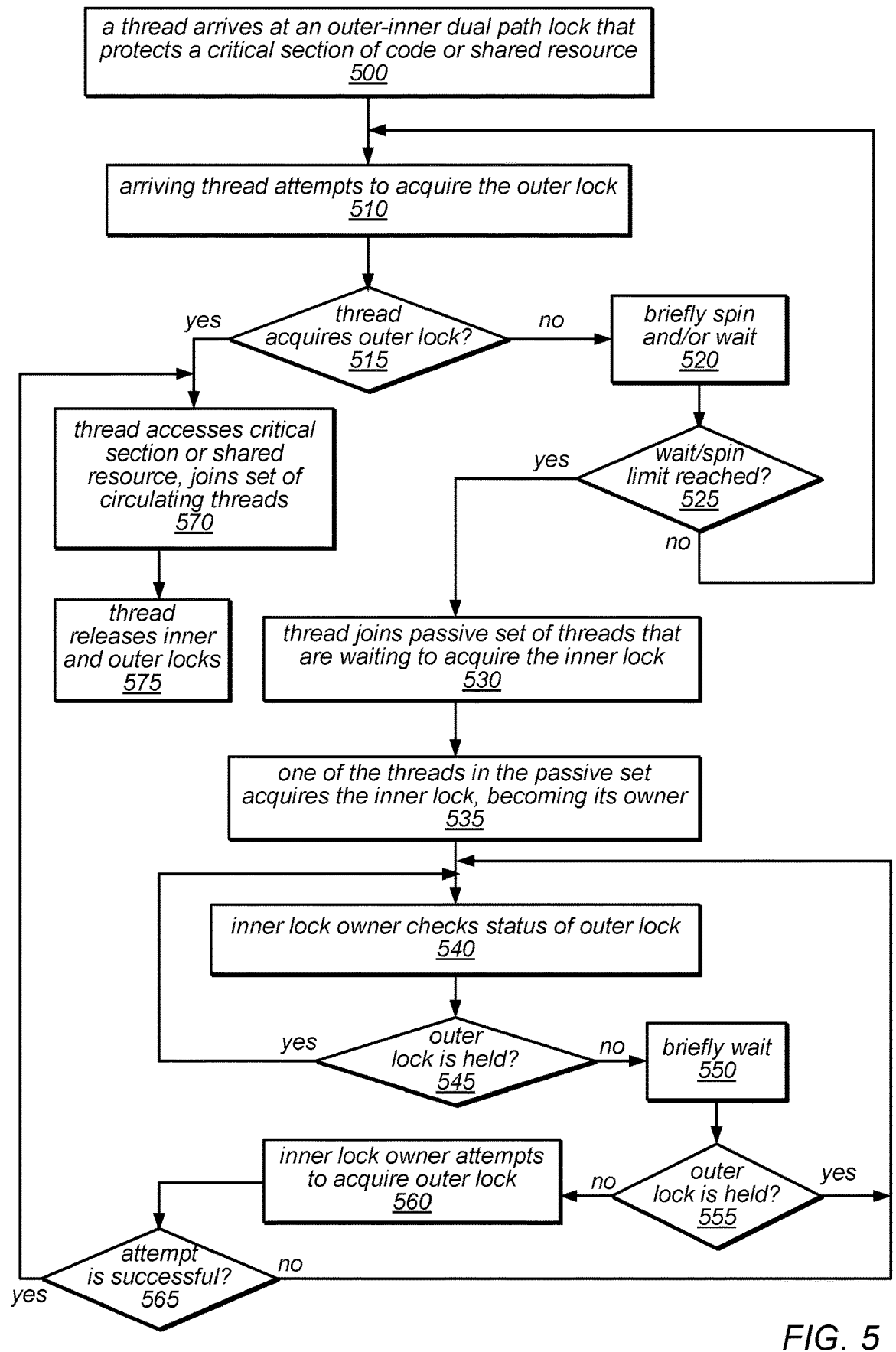
FIG. 5 is a flow diagram illustrating one embodiment of a method for acquiring an outer-inner dual path lock, as described herein.
Figure 7:
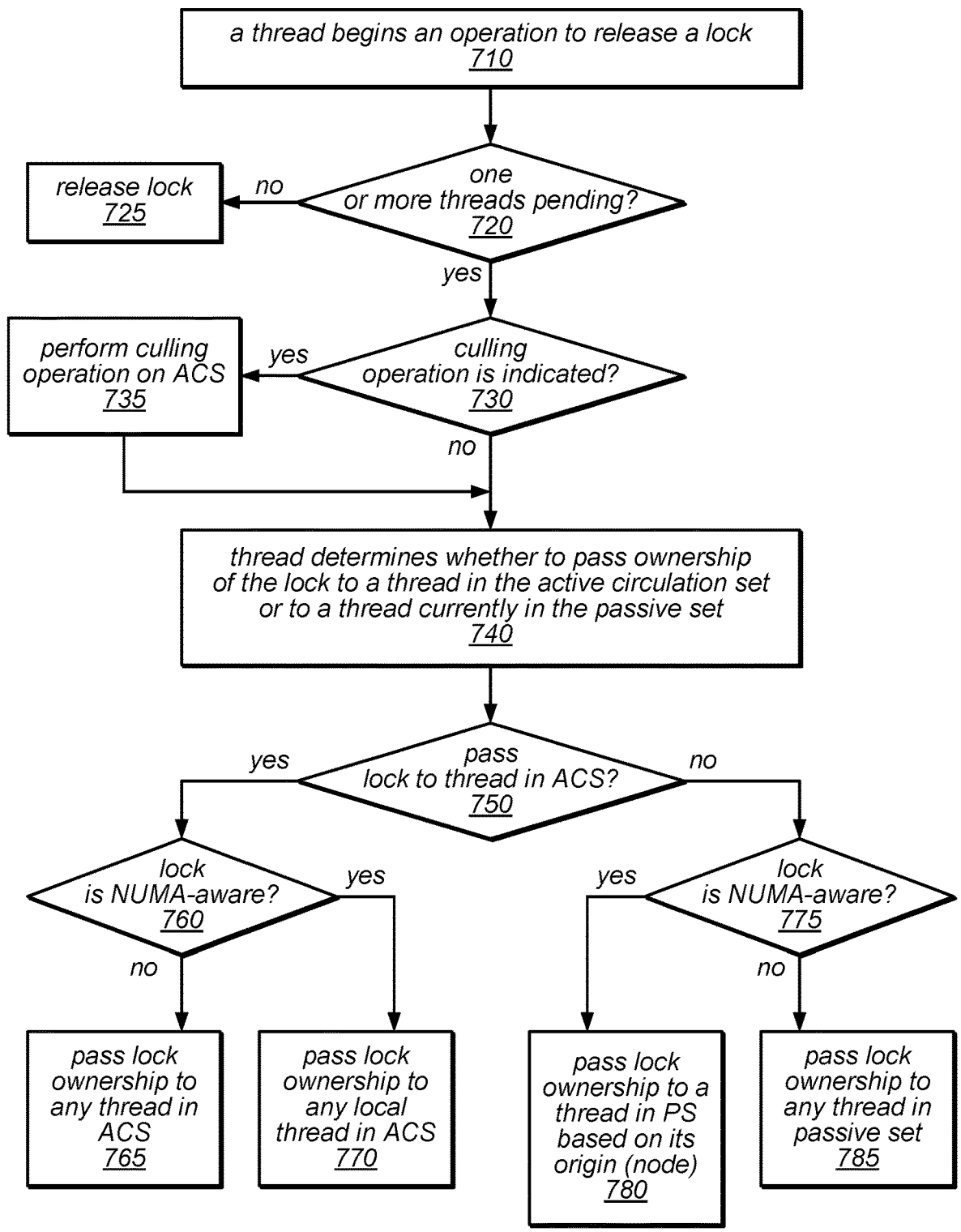
FIG. 7 is a flow diagram illustrating one embodiment of a method for releasing a concurrency-restricting lock, as described herein.

One embodiment of a method for acquiring an outer-inner dual path lock is illustrated by the flow diagram in FIG. 5. As illustrated at 500, in this example, the method may include a thread arriving at an outer-inner dual path lock that protects a critical section of code or shared resource. The method may include the arriving thread attempting to acquire the outer lock (as in 510). If the thread successfully acquires outer lock (shown as the positive exit from 515), the method may include the thread accessing the critical section or shared resource that is protected by the lock, and joining a set of threads that are circulating over the outer lock (e.g., an active circulation set for the outer-inner dual path lock), as in 570. When the lock is no longer needed, the method may include the thread that holds the lock releasing both the inner and outer locks, as in 575. Note that FIG. 7, which is described in more detail below, illustrates one example of a method for performing a release (or "unlock") operation and passing ownership of a concurrency-restricting lock to another thread, according to at least some embodiments.

As illustrated in this example, if the thread fails to acquire the outer lock (shown as the negative exit from 515), the method may include the thread briefly spinning and/or waiting before making one or more additional attempts to acquire the outer lock. This is illustrated in FIG. 5 by element 520 and by the path from 520 to 525 and then from the negative exit of 525 to 510. Once an applicable wait or spin limit has been reached (shown as the positive exit from 525), the method may include the thread joining a passive set of threads that are waiting (or, in other embodiments, are actively attempting) to acquire the inner lock (as in 530). As illustrated in FIG. 5, at some point, the method may include one of the threads in the passive set acquiring the inner lock, thus becoming the owner of the inner lock (as in 535). Subsequently, at some time later, the method may include the inner lock owner checking the status of the outer lock (e.g., to determine whether or not it is currently held by another thread), as in 540. If the outer lock is currently held by another thread, the method may include repeatedly (e.g., periodically or continuously) checking the status of the outer lock while waiting for its release. This is illustrated in FIG. 5 by the path from the positive exit of 545 to 540.

As illustrated in this example, if the outer is not currently held by another thread (shown as the negative exit from 545), the method may include the thread that owns the inner lock briefly waiting before attempting to acquire the outer lock (e.g., performing "anti-spinning" as described herein), as in 550. If, after the thread has waited briefly, the outer lock is still not held (shown as the negative exit from 555), the method may include the inner lock owner attempting to acquire the outer lock, as in 560. If the attempt is successful (shown as the positive exit from 565), the method may include the thread (the inner lock owner) accessing the critical section or shared resource that is protected by the outer-inner dual path lock, and then joining the set of threads that are circulating over the outer lock (e.g., the active circulation set for the outer-inner dual path lock), as in 570. As noted above, when the lock is no longer needed, the method may include the thread that holds the lock releasing both the inner and outer locks, as in 575.

As illustrated in this example, if, after the thread has waited briefly, the outer lock is now held (shown as the positive exit from 555), the method may again include the inner lock owner repeatedly (e.g., periodically or continuously) checking the status of the outer lock while waiting for its release. This is illustrated in FIG. 5 by the path from the positive exit of 555 to 540. For example, between the time that the outer lock was determined to be available (at 545) and the time when its status was checked again (at 555), it may have been acquired by one of the threads in the active circulation set and may no longer be available for acquisition by the inner lock holder. Note that, while note illustrated in FIG. 5, if and when another thread arrives at the OIL lock, some or all of the operations illustrated in FIG. 5 (e.g., beginning with element 510) may be performed in parallel with those described above for the earlier-arriving thread. For example, a newly arriving thread may contend with the earlier-arriving thread (at element 510) if the earlier-arriving thread has not acquired the outer lock and has not yet been placed in the passive set (e.g., while it is spinning, waiting, or re-attempting to acquire the outer lock, as in elements 520 and 510). In another example, the newly-arriving thread may, after failing to acquire the outer lock, join the passive set of claims (as in 530) and may contend with the earlier-arriving thread (and any other threads in the passive set) to acquire the inner lock, as in 530. In fact, in some cases, the newly-arriving thread, rather than the earlier-arriving thread or any other threads in the passive set, may be the thread that acquires the inner lock (as in 535) and that goes on to attempt to acquire the outer thread (as in 540-565).

In at least some embodiments of the concurrency-restricting locks described herein, a culling operation may be performed from time to time in order to reduce the number of threads in the active circulation set for the concurrency-restricting lock (with or without regard to the nodes from which various threads in the active circulation set and/or the passive set originated). For example, in some embodiments, a culling operation may be performed periodically by a dedicated process (e.g., by one of the threads of a multi-threaded application that access the concurrency-restricting lock or by a separate, dedicated thread), while in other embodiments, a culling operation may be performed (or at least initiated) as part of an operation to release the concurrency-restricting lock (e.g., by its current owner). As described herein, the culling policy itself may be dependent on a lock saturation threshold of the concurrency-restricting lock, on the value of a performance metric associated with the concurrency-restricting lock, on which of the plurality of computing nodes each of the threads in the active circulation set is executing on, and/or on other criteria, in different embodiments.

Figure 6:
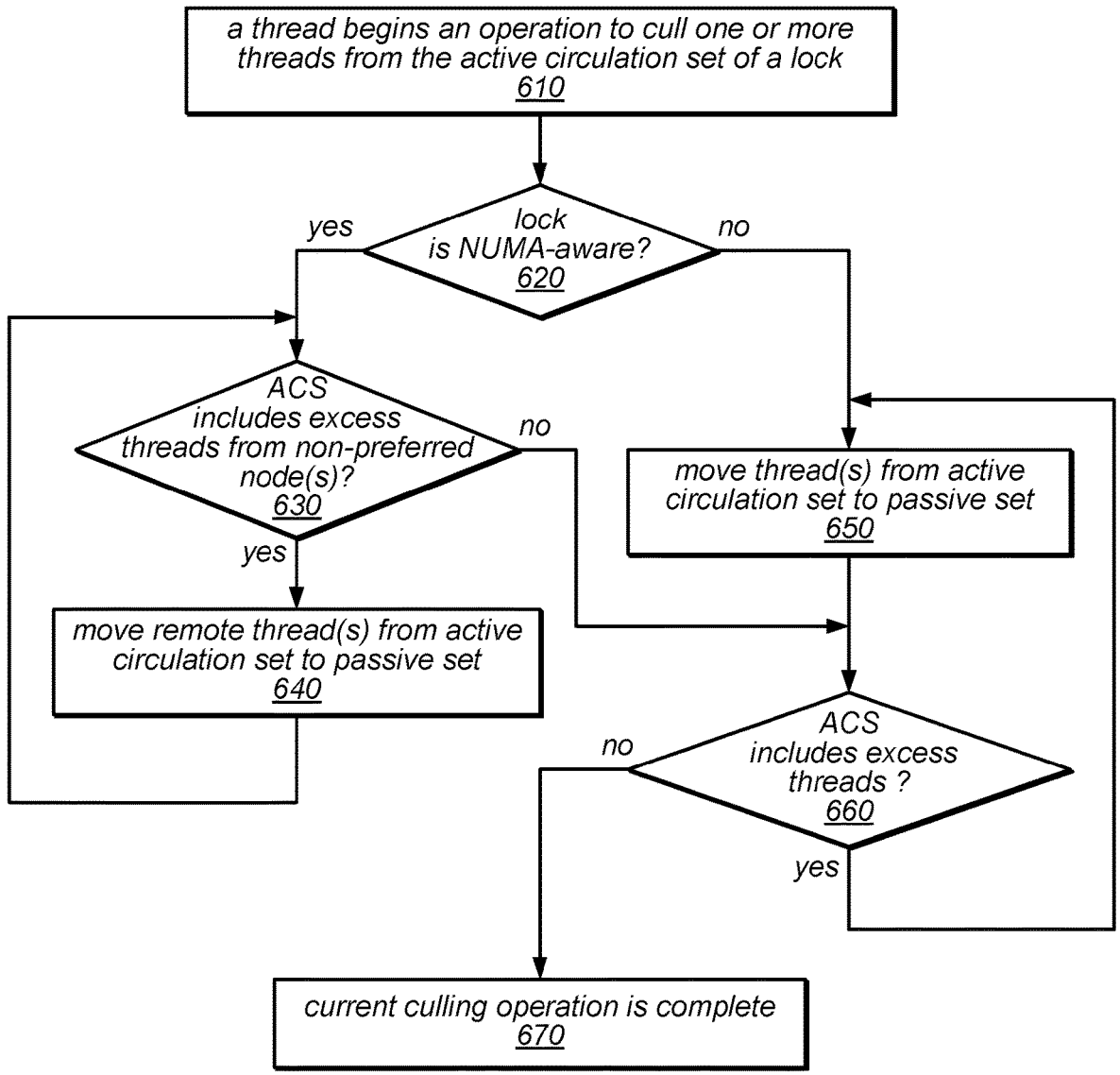
FIG. 6 is a flow diagram illustrating one embodiment of a method for culling an active circulation set of a concurrency-restricting lock, as described herein.

One embodiment of a method for culling an active circulation set of a concurrency-restricting lock (e.g., an outer-inner dual path lock or another type of concurrency-restricting lock, such as those described herein) is illustrated by the flow diagram in FIG. 6. As illustrated at 610, in this example, the method may include a thread beginning an operation to cull one or more threads from the active circulation set of the concurrency-restricting lock. As described herein, such a culling operation may be performed at different times and/or may be triggered by different events or conditions, in different embodiments. If the concurrency-restricting lock is not a NUMA-aware lock (shown as the negative exit from 620), the method may include moving one or more threads from the active circulation set to the passive set of the concurrency-restricting lock, as in 650. For example, moving threads from the active circulation set to the passive set may involve moving data representing those threads from one data structure or list (or portion thereof) to a different data structure or list (or portion thereof). More specifically (e.g., for an OIL lock), moving threads from the active circulation set to the passive set may involve moving data representing those threads from a data structure that maintains data representing a set of threads that are contending for the outer lock to a data structure that maintains data representing a set of threads that are contending for the inner lock. As illustrated in this example, if the active circulation set still includes excess threads (according to a culling policy for the concurrency-restricting lock), the operation illustrated at 650 may be repeated one or more times until there are no additional excess threads. This is illustrated in FIG. 6 by the path from the positive exit of 660 to 650. If, or once, there are no excess threads in the active circulation list (shown as the negative exit from 660), the current culling operation may be complete (as in 670).

As illustrated in this example, if the lock is a NUMA-aware lock (shown as the positive exit of 620), and if the active circulation set includes excess threads from one or more non-preferred (or remote) nodes (shown as the positive exit from 630, the method may include moving one or more remote threads (threads executing on a non-preferred or remote node) from the active circulation set to the passive set, as in 640. As noted above, moving threads from the active circulation set to the passive set may involve moving data representing those threads from one data structure or list (or portion thereof) to a different data structure or list (or portion thereof), or may involve moving data representing those threads from a data structure that maintains data representing a set of threads that are contending for the outer lock of an OIL lock to a data structure that maintains data representing a set of threads that are contending for the inner lock of an OIL lock. If the active circulation set still includes excess threads from non-preferred (or remote) nodes, the operation illustrated at 630 may be repeated one or more times until there are no additional excess threads from non-preferred (or remote) nodes in the active circulation set. This is illustrated in FIG. 6 by the path from the positive exit of 630 to 640 and from 640 to 630.

As illustrated in this example, even if (or once) all of the excess threads that are executing on non-preferred (or remote) nodes have been removed from the active circulation set, this may or may not mean that there are no excess threads in the active circulation set, as there still may be some excess threads in the active circulation set that originated from the preferred (or home) node. For example, if, after removing all excess threads that originated from a non-preferred (or remote) node (shown as the negative exit from 630), the active circulation set still includes excess threads (shown as the positive exit from 660), the operation illustrated at 650 may be repeated one or more times until there are no additional excess threads. In this case, the operation(s) may move excess threads that originated from the preferred (or home) node. This is illustrated in FIG. 6 by the path from the negative exit of 630 to the input of 660, and from the positive exit of 660 to 650. If, or once, there are no excess threads in the active circulation list (shown as the negative exit from 660), the current culling operation may be complete (as in 670).

As noted above, in some embodiments of the concurrency-restricting locks described herein, various culling operations may be performed (or initiated), various fairness policies may be applied, and/or ownership of the concurrency-restricting lock may be passed to another thread as part of an operation by the current lock owner to release the lock. One embodiment of a method for releasing a concurrency-restricting lock (e.g., an outer-inner dual path lock or another type of concurrency-restricting lock such as those described herein) is illustrated by the flow diagram in FIG. 7. As illustrated at 710, in this example, the method may include a thread beginning an operation to release the concurrency-restricting lock. As described herein, this operation may be performed at different times and/or may be triggered by different events or conditions, in different embodiments. For example, in some embodiments, the thread holds the lock owner may invoke an operation to release the lock when it has finished executing a critical section of code that is protected by the lock or when it no longer requires access to a shared resource that is protected by the lock. If (as shown by the positive exit from 720) there are no threads pending (e.g., if there are no threads currently contending for the lock as part of an active circulation set and there are no threads waiting for an opportunity to contend for the lock as part of a passive set), the method may include releasing the lock (as in 725).

As illustrated this example, a release operation for a concurrency-restricting lock may include (or trigger) a culling operation (e.g., one that may move one or more threads from an active circulation set for the lock to a passive set for the lock) and/or the application of a long-term fairness policy (e.g., one that may move one or more threads from a passive set for the lock to an active circulation set for the lock). For example, in some embodiments, a release operation may include (or trigger) the releasing thread making a determination of whether or not a culling policy and/or a fairness policy should be applied at that time and, if so, may include applying those policies before releasing the concurrency-restricting lock and/or returning from the lock release operation. If (as shown by the positive exit from 730), a culling operation is indicated (e.g., according to an applicable culling policy), the method may include performing a culling operation on the active circulation set (as in 735). One example of such a culling operation is illustrated in FIG. 6 and descried above. However, if (as shown by the negative exit from 730) it is determined that a culling operation is not indicated at this time, the operation illustrated in 735 may be elided. In either case, the method may include the releasing thread determining whether to pass ownership of the concurrency-restricting lock to a thread in the active circulation set or to a thread currently in the passive set (as in 740).

If the releasing thread determines that ownership of the concurrency-restricting lock is to be passed to a thread in the active circulation set (shown as the positive exit from 750) and if the concurrency-restricting lock is not a NUMA-aware lock (shown as the negative exit from 760), the method may include the releasing thread passing ownership of the concurrency-restricting lock to any thread in the active circulation set (as in 765). In various embodiments, the thread to which ownership of the concurrency-restricting lock is passed may be a thread that is at the head of (or is the next sequential element of) a queue, list, stack, or other data structure in which data representing the threads in the active circulation set is maintained. In other embodiments, the thread to which ownership of the concurrency-restricting lock is passed may be selected from among the threads in the active circulation set using some other mechanism and/or in accordance with a local fairness policy.

If the releasing thread determines that ownership of the concurrency-restricting lock is to be passed to a thread in the active circulation set (shown as the positive exit from 750) and if the concurrency-restricting lock is a NUMA-aware lock (shown as the positive exit from 760), the method may include the releasing thread passing ownership of the concurrency-restricting lock to any local thread in the active circulation set (as in 770). For example, the releasing thread may pass ownership of the concurrency-restricting lock to a thread that originated from the currently preferred (or home) node, which may or may not be at the head of (or the next sequential element of) a queue, list, stack, or other data structure in which data representing the threads in the active circulation set is maintained, and which may be selected from among the local threads in the active circulation set using some other mechanism and/or in accordance with a local fairness policy, in some embodiments.

As illustrated in this example, if the releasing thread determines that ownership of the concurrency-restricting lock is not to be passed to a thread in the active circulation set, but to a thread that is currently is the passive set (shown as the negative exit from 750) and if the concurrency-restricting lock is not a NUMA-aware lock (shown as the negative exit from 775), the method may include the releasing thread passing ownership of the concurrency-restricting lock to any thread in the passive set (as in 785). Here again, the thread to which ownership of the concurrency-restricting lock is passed may be a thread that is at the head of (or is the next sequential element of) a queue, list, stack, or other data structure in which data representing the threads in the passive set is maintained, or may be selected from among the threads in the passive set using some other mechanism and/or in accordance with a local or long-term fairness policy, in different embodiments.

If the releasing thread determines that ownership of the concurrency-restricting lock is not to be passed to a thread in the active circulation set, but to a thread that is currently is the passive set (shown as the positive exit from 750) and if the concurrency-restricting lock is a NUMA-aware lock (shown as the positive exit from 775), the method may include the releasing thread passing ownership of the concurrency-restricting lock to a thread in the passive set based on the node from which it originated (as in 780). For example, the releasing thread may pass ownership of the concurrency-restricting lock to a thread that originated from a non-preferred (or remote) node, which may or not be at the head of (or the next sequential element of) a queue, list, stack, or other data structure in which data representing the threads in the passive set is maintained. In some embodiments, the thread to which ownership of the lock is passed may be selected from among the threads in the passive in accordance with a local or long-term fairness policy. For example, the successor thread may be selected in a manner that (over time) distributes ownership of the lock among threads originating from different nodes or that, from time to time, changes the preferred (or home) node, e.g., according to an applicable fairness policy In some embodiments, passing ownership of a concurrency-restricting lock to another thread may include releasing the lock after identifying the lock owner's successor. Note that, in some embodiments, passing ownership of a concurrency-restricting lock to a thread in the passive list may include promoting the thread to the active circulation set of the concurrency-restricting lock, while in other embodiments it may include applying another mechanism to afford the thread the opportunity to contend for the lock (after which, if successful) it may be added to the active circulation set. Note also that, in some embodiments (e.g., when the concurrency-restricting lock is an outer-inner dual path lock), passing ownership of the concurrency-restricting lock to another thread (as illustrated at 765, 770, 780, and/or 785) may include releasing both an inner and outer lock.

One embodiment of an outer-inner dual path lock that employs the concurrency restriction techniques described herein may be illustrated using the following example pseudo code:

```
01: class OIL:                    // outer-inner dual path lock
02:   volatile int OuterLock      // optimistic path : test-and-test-set lock
03:   Thread * volatile IOwner    // Owner of InnerLock
04:   MCSLock InnerLock           // pessimistic path for contention
05:
06: Lock (Thread * Self, OIL * L) :
07:   // Optimistic fast-path ...
08:   // ideally, threads in ACS will wait only briefly for the lock
09:   if TryLock (&L->OuterLock) : return
10:   if TrySpin (&L->OuterLock) : return // brief bounded spin attempt
11:
```

```
12:    // Revert to pessimistic and conservative slow path ...
13:    // Detected contention: excessive waiting ; cull and divert thread
14:    // must take pessimistic slow-path : move from active to passive
15:    MCSAcquire (&L->InnerLock)
16:    assert L->IOwner == null      // at most one "IOwner" thread at any
       time
17:    L->IOwner = Self ; membar store-load ;
18:    for
19:      if TryLock(&L->OuterLock) : break      // depart passive; join active
20:      Park( )
21:
22: Unlock (Thread * Self, OIL * L) :
23:    assert L->OuterLock != 0
24:    L->OuterLock = 0         // release outer lock
25:    membar store-load
26:    auto s = L->IOwner
27:    if s == null : return
28:    if s == Self :
29:      L->IOwner = null    // acquired lock via slow path
30:      MCSRelease (&L->InnerLock)
31:    else :
32:      // redundant unpark operations are expected to be cheap
33:      // optional optimization : skip the following unpark( )
34:      // if the existence of "visible" spinners can be detected at line 10
35:      Unpark (s)       // wake thread parked at line 20
```

As previously noted, in some embodiments (including the embodiment illustrated by the pseudo-code above) an OIL lock is considered to be held if and only if the outer lock is held. There is no long-term waiting on the outer lock, however. In the example OIL embodiment illustrated above, the outer lock is implemented as a polite test-and-test-and-set TATAS lock and the inner lock is implemented as an MCS lock. However, other combinations of lock types are possible and reasonable, in other embodiments. In this example, the MCS lock that implements the inner lock has been augmented to use a simple spin-then-park waiting strategy, rather than using spinning. In this example, when a thread first arrives at the OIL lock, it may (optimistically) attempt to acquire the outer lock. If it is successful, it may return from its operation to acquire the lock as the lock owner. This is shown in the pseudo-code above by the return on line 9.

In this example, threads circulating over the outer lock or spinning at line 10 form the active circulation set (ACS), while threads blocked on the inner lock at line 15 constitute the passive set (PS). Here, the ACS is implicit and the passive set is explicit in the MCS queue. More precisely, the ACS consists of the current owner, threads spinning at line 10, and circulating threads that are currently executing in their respective non-critical sections. In this example, once one of the threads in the passive set acquires inner lock (at line 15), it moves on to line 16, where it installs itself in as the new owner (holder) of the inner lock. As described herein, the inner lock holder may, from time to time, attempt to inject itself into the active circulation set and contend for the outer lock, while the other threads in the passive set remain blocked (e.g., waiting for a chance to acquire the inner lock and, consequently, an opportunity to contend for the outer lock). Restricting the threads that can contend for the outer lock to those in the ACS plus (occasionally) one of the threads from the passive set, and limiting the opportunities for the inner lock holder to acquire the lock, may limit the number of times at which, if contention on the outer lock drops, a thread from the passive set is able to acquire the outer lock (thus intermixing the ACS and the PS more often than may be desirable).

In the example implementation illustrated above, the outer lock uses competitive succession to identify the thread that will become the next owner, and the inner lock (the MCS lock) uses succession by direct handoff. In this example, the single "IOwner" thread waiting at lines 18-20 may be thought of as being in transitional state between the passive and active sets. The IOwner thread may monitor the outer lock, attempting to acquire it only if (after giving the threads in the ACS a chance to acquire it following its release) no other thread takes it. To provide long-term fairness, if a thread has languished too long in the loop at lines 18-20, an anti-starvation technique may be applied. Specifically, if the IOwner has waited too long, it can become "impatient". One approach may be to have that thread spin more aggressively. Another technique may be to arrange for direct succession to that thread the next time unlock( ) is called. This may yield a hybrid succession that uses competitive succession as the default, but that conservatively reverts to direct succession to ensure progress and fairness.

In the example illustrated above, the park(T) interface may allow a thread T to "park" or block itself, rendering the caller ineligible to be scheduled or dispatched. A corresponding unpark(T) may wake the target thread T, making it again ready for dispatch. Note that, in some embodiments, an unpark(T) operation can occur before the corresponding park( ) by T, in which case park( ) returns immediately and "consumes" the pending unpark( ) action. In some embodiments, the park-unpark facility may be implemented via a restricted-range semaphore, e.g., one that only allows values of 0 (representing a neutral state) and 1 (representing a state in which an unpark operation is pending).

In some embodiments (e.g., on platforms in which memory fences are relatively costly), the memory barrier shown at line 25 above may, in some embodiments, be elided if the park( ) call at line 20 is modified so that it uses a timed wait, instead. Eliding the barrier may admit a race on platforms with weak memory consistency models where the program order of "ST OuterLock; LD IOwner" may be architecturally reordered to "LD IOwner; ST OuterLock," in memory-visibility order. In turn, this order may allow a race where a thread in unlock( ) could fail to notice a newly-arrived thread and could unpark( ) the newly-arrived thread in the lock( ) path. The timed park( ) operation may recover from this scenario.

As noted above, to reduce the rate of the flow of threads from the passive set to the active circulation set, the somewhat counter-intuitive concept of "anti-spinning" may be applied. For example, threads may typically spin while trying to acquire lock. However, an anti-spinning mechanism may attempt to avoid taking a lock over a short bounded period. For example, for various reasons, succession policies may prefer that one of the threads already in the ACS acquire the outer lock next (when it is released by the current owner of the outer lock), rather than the IOwner thread waiting at lines 18-20. Ideally, a thread that has just arrived at the OIL lock (a thread that has just invoked a lock( ) operation) will be able to acquire the outer lock. However, if the IOwner thread acquires the lock at that point, assuming a steady-state load and just enough active threads to saturate the lock, some other thread in the ACS will fail its spinning attempt at line 10 and move into the passive set. This migration may increase the LWS size, which may be undesirable. In other words, the IOwner thread may (by acquiring the outer lock) displace some other member of the ACS, while it may be preferable for the ACS and passive sets to remain relatively stable. In some embodiments, an anti-spinning technique may be applied in order to reduce the rate of such displacement and to maintain more stable partitions between the ACS and the PS.

Two specific implementations of anti-spinning are illustrated in the code above. In the first example, the TryLock operator (found at line 19) does the anti-spinning. Here, the IOwner thread monitors the outer lock. Normally, if a thread is spinning waiting for a lock and observes that the lock has just been released, it immediately tries to aggressively "pounce" on the lock to acquire it. However, with anti-spinning, if the IOwner sees that the outer lock is not held, it may defer for some period (giving newly-arriving threads or threads already in the ACS a chance to obtain the outer lock) before attempting to acquire the outer lock. In this example, it is hoped that a member of the ACS will acquire the lock in the interim. In other words, the anti-spinning may prevent the IOwner thread from being too aggressive in obtaining the outer lock since, if the lock circulates too rapidly between the ACS and PS, it may not perform any better than if no concurrency restriction techniques were applied at all. Eventually, to ensure progress and liveness, the IOwner may need to claim the lock, e.g., if there are no members of the ACS present to do so.

Quite a number of anti-spinning policy variations are possible, in different embodiments. One example policy that has worked in practice in prototypes is for the IOwner thread to check the outer lock N times in a row with fixed delays between the checks. If the number of times it observed that the outer lock was free during the sampling episode exceeded some bound B, then it will try to acquire the lock. This technique may provide a relatively simple way to detect under-saturation. An example variation on the policy described above (one that may improve long-term fairness) may be to gradually decrease N and B between sampling episodes. Note that it may be preferable to make the IOwner thread less aggressive, and to defer (within reason) to arriving threads in the ACS.

Another example anti-spinning technique is illustrated at line 35 in the pseudo-code shown above. Here, the unpark( ) operation attempts to wake the IOwner thread. However, if, while spinning briefly just before line 35, some other member of the ACS takes the lock during that spinning period, there may be no need to wake the IOwner thread. In this example, since the IOwner does not wake up, it will not contend for the lock, and the ACS and passive sets will remain intact. Note that a non-redundant unpark( ) operation may require a system call into the kernel to wake the target thread. Avoiding such expensive and high-latency calls may improve performance, in at least some embodiments.

As previously noted, the example outer-inner dual-path lock illustrated above implements a hybrid waiting policy in which recently arrived threads wait (via brief and bounded global spinning) on the outer lock. If they fail to acquire the outer lock, they revert to the inner lock, where, as part of the spin-then-park protocol in MCSAcquire( ) they spin locally. Finally, failing that, the acquisition attempt reverts to parking. Note that, in this and other examples, it is expected that the rate of circulation within the ACS will be much faster than circulation between the active circulation set and the passive set. Note also that, in some embodiments, spin-then-park waiting mechanisms may be implemented under the park-unpark interface, and are not shown in the pseudo-code above.

As shown in the example above, if the IOwner acquires the outer lock and executes the critical section protected by the OIL lock, it may have an additional duty to perform when it no longer needs the lock. In this case, it may release the outer lock, as usual, and then may also have to release the inner lock. In other words, the release of the inner lock may be deferred until the IOwner is finished executing the critical section, at which point it may release both the inner and outer locks. This is illustrated at lines 29-30 above. Holding the inner lock while executing the critical section may prevent other threads in the passive set from being granted an opportunity to contend for the outer lock.

In some embodiments (e.g., in order to further restrict and constrain concurrency), the implementation of TrySpin( ) shown in Line 10 above, may be configured to restrict or cap the number of threads spinning on the outer lock at any given moment. In some embodiments, TrySpin( ) may apply a test-and-test-and-set policy with back-off. A complementary "local" policy in the TrySpin( ) implementation may abandon the current spin episode if the "test-and-set" atomic operation fails too frequently. This condition may indicate a sufficient flow of threads in the ACS over the lock. Some embodiments may maintain a count of the number of such failures and may abandon the spin attempt when and if the count exceeds some predetermined bound. In another embodiment, after a test-and-set failure, a Bernoulli trial may be performed (e.g., via a simple uniform pseudo-random number generator with thread-local state) in order to decide whether to abandon the spin attempt. In yet another implementation, TrySpin( ) may be configured monitor either traffic over the lock or the arrival of spinners, and to abandon the spin attempt if the rate or flux is too high (e.g., if it exceeds a predetermined threshold value). In this example, by abandoning the spin attempt early, the thread may revert from spinning to parking.

Note that, in this and other examples, all atomic operations may be assumed to have full bi-directional fence/member semantics. Note also that, in the example pseudo-code listings included herein, a total store order (TSO) memory consistency model may also be assumed.

While the example outer-inner dual path lock described above employs a test-and-test-and-set lock as the outer lock and an MCS type lock as the inner lock, other types and/or combinations of locks of can be employed as the inner lock and outer locks, in other embodiments. Note that, if the inner lock is itself NUMA-friendly (e.g., if it is a "cohort" lock) then the aggregate "OIL" lock may also be NUMA-friendly. For example, as threads circulate between the active circulation set and the passive set, the inner lock may tend to cull or filter out threads from different nodes, and the active circulation set may tend to converge toward a set of threads that are co-located (co-resident) on a given node. In this case, the NUMA-diversity of the ACS may decrease and the number of lock migrations may also decrease, yielding better throughput.

In one example alternative OIL-type locking scheme (referred to herein as an OILA lock), the inner MCS lock may be replaced with an arrival list and outflow list. In this example, newly arrived threads enqueue onto the arrival list in a lock-free fashion. Here, threads passing through the slow contention path undergo the following state transitions: Arrival List→OutFlow List→IOwner→Ownership. In this example, which is illustrated in more detail by the example pseudo-code below, the arrival list may be able to safely tolerate multiple concurrent "push" operations, but only one "pop" or detach operation at a time. In some embodiments, this lock may employ an MPSC (multiple producer single consumer) access model with multiple concurrent producers but at most one consumer, and may be immune to ABA corruption. Collectively, ArrivalList, OutFlow and IOwner constitute a single logical list of threads that are stalled waiting for the OILA lock. Using two distinct lists may reduce coherence contention on the list ends.

In this OIL variant, the "IOwner" variable may act as a lock to ensure that there is at most one active pop or detach operation at any given time. In other words, the IOwner may serve as an "inner lock" that protects the arrival and outflow lists. In this example, only the thread is the IOwner can operate on the outflow list or detach the arrival list and drain the contents into the outflow list. IOwner may be considered asymmetric in that one thread can acquire that lock and pass ownership of IOwner to a successor, and the successor will ultimately release or pass ownership of IOwner. Note that, in this example, there may never be contention or waiting for the inner IOwner lock. Instead, only "trylock" operations are required, and ownership of IOwner is passed via direct succession. Note also that the IOwner thread is conceptually at the front of the logical list (the combined single logical list of threads that are stalled waiting for the OILA, and that includes the lockArrivalList, OutFlow list and IOwner).

As noted above, in this example, at any given time there can be at most one IOwner thread for a given OILA lock. The IOwner thread is one that is waiting for the OILA lock but has been unlinked from the arrival and outflow lists. Once a thread has been designated as the IOwner thread, it may remain so until it manages to acquire the outer lock. As in the OIL lock described earlier, the IOwner thread may be eligible to try to acquire the outer lock, while threads resident on the arrival list or outflow list may not have that opportunity, but must wait for their turn to become the IOwner thread.

As illustrated in the pseudo-code for the OILA shown below, at unlock( ) time, if a tentative successor thread needs to be selected, the first place to look for a successor may be the OutFlow list. If a thread is selected from the OutFlow list, this thread becomes the next "IOwner" thread. If the OutFlow list is empty, an attempt may be made to transfer the Arrival list into the OutFlow list.

Note that, in this and other examples, the "CAS" primitive may represent an atomic compare-and-swap type operation in which the first argument is the memory location, the second argument is the comparand, and the final argument is the value to which the memory location should be set if the memory location equals the comparand. A CAS-type operation returns the value that was previous stored in the target memory location. Similarly the "SWAP" primitive may represent an operation that atomically fetches a value from a target location and stores a new value into that same location, returning the fetched value. The SWAP operator atomically loads the value from the address given as the first argument, stores the second argument into that address, and then returns the original value. As noted above, in the example pseudo-code listings included herein, all atomic operations may be assumed to have full bi-directional fence/member semantics, and a total store order (TSO) memory consistency model may also be assumed.

One embodiment of the OILA lock mechanism described herein may be further illustrated by the example pseudo-code below.

```
01: class OILA :            // alternate outer-inner dual path lock
02:   volatile int OuterLock   // optimistic path : test-and-test-set lock
03:   Thread * volatile IOwner
04:   Thread * volatile Arrival
05:   Thread * volatile OutFlow
06:
07: Succession (Thread * Self, OILA * L) :
08:   for
09:     // this thread owns IOwner lock
10:     assert L->IOwner == 1
11:     // first, try to draw a thread from the Outflow list
12:     auto List = L->OutFlow
13:     if List != null :
14:       PickFromList :
15:       // pop front of List as successor
16:       L->OutFlow = List->Next
17:       // appoint thread referenced by "List" as new IOwner thread
18:       // Pass ownership of IOwner to successor
19:       L->IOwner = List
20:       Unpark (List)
21:       return
22:     assert L->OutFlow == null
23:     // resort to Arrival List : RATs = recently arrived threads
24:     // bulk en-mass transfer from the Arrival list into Outflow
25:     // detach and privatize list of RATs; drain from Arrival to Outflow
26:     List = SWAP (&L->Arrival, null)
27:     if List != null :
28:       // optionally reverse list or sort by NUMA node ID
29:       // impose desired queue discipline and ordering
30:       // Reversing the list in-hand yields pure strict LIFO
31:       // Using the list in ambient order yields an admission order
32:       // akin to "palindrome" or "elevator seek" schedules
33:       goto PickFromList
34:     // no apparent successor threads; release IOwner inner lock
35:     L->IOwner = 0
36:     membar store-load
37:     // ratify and re-validate apparent lack of successor threads
38:     // note that it needs to check only that L->Arrival, and not L->OutFlow
39:     if L->Arrival == null : return
40:     // if some other thread holds the IOwner lock, then responsibility
41:     // for succession passes to that thread through delegation
42:     if CAS (&L->IOwner, null, 1) != null : return
43:
44: Lock (Thread * Self, OILA * L) :
45:   if TryLock (&L->OuterLock) : return
46:   if TrySpin (&L->OuterLock) : return
47:   // must take pessimistic slow-path
48:   // Optional optimization : try to "barge" directly on IOwner
49:   assert L->IOwner != Self
50:   if CAS (&L->IOwner, null, Self) == null : goto StagingLoop
51:   // Enqueue Self on Arrival List : CAS-based "push"
52:   auto h = L->Arrival
53:   for
54:     Self->Next = h
55:     auto v = CAS (&L->Arrival, h, Self)
56:     if v == h : break
57:     h = v
58:   // detect and recover from a potential race with unlock( )
59:   // where owner drops Outer lock and departs and then
60:   // this thread enqueues itself onto Arrival list
61:   // absent recovery, this thread could be stuck indefinitely on Arrival
62:   // list and fail to advance to IOwner position
63:   // precautionary succession - avoid progress and liveness failure
64:   // only the thread that transitioned L->Arrival from null to non-null
65:   // must perform this check
66:   if h == null && CAS (&L->IOwner, null, 1) == null :
67:     Succession (Self, L)
68:   // wait while thread resides on Arrival or Outflow lists
69:   while L->IOwner != Self :
70:     Park( )
71:   // Self has moved from ArrivalList/OutFlow to IOwner
72:   // can now compete for lock
73:   StagingLoop :
74:   for
75:     assert L->IOwner == Self
76:     if TryLock(&L->OuterLock) : break
77:     Park( )
78:
79: Unlock (Thread * Self, OILA * L) :
80:   assert L->OuterLock != 0
81:   L->OuterLock = 0
82:   membar store-load
```

```
83: auto s = L->IOwner
84: if s == null || s == 1 : return
85: if s == Self :
86:   // this thread acquired the lock via the slow path
87:   // optional optimization to reduce rate of unnecessary unpark
      operations
88:   // Mark IOwner as busy
89:   L->IOwner = 1     // overwrite Self with 1
90:   Succession (Self, L)
91: else :
92:   Unpark (s)
```

In some embodiments, a concurrency-restricting lock may be constructed from a lock that employs last-in-first-out (LIFO) admission ordering. In some embodiments, a LIFO lock may be deeply unfair. However, variants of LIFO locks may be configured to provide concurrency restriction, NUMA-awareness, and/or long-term fairness, in different embodiments. Before describing one such variant, a more typical LIFO lock is presented below. In this example, in order for a thread to acquire the LIFO lock, it may use an atomic CAS-type operation to attempt to update the state of the LIFO lock. The lock state may be either 0 or 1, or may point to a stack of threads that are waiting to acquire the LIFO lock. If, when a thread arrives at the LIFO lock, its state is 0, it may use a CAS-type operation to attempt to change the state from 0 to 1. If this is successful, the newly-arrived thread may acquire the lock and proceed to access the critical section of code or shared resource that is protected by the LIFO lock. However, if, when a thread arrives at the LIFO lock, its state is not 0 (e.g., if its state is 1 or a value other than 0 or 1), this may indicate that the lock is held by another thread and/or that there is a stack of threads waiting to acquire the LIFO lock. In this case, the newly-arrived thread may use an atomic CAS-type operation to push itself onto the front of the stack of threads that are waiting to acquire the LIFO lock. Again note that, in this example, because the threads are waiting on a stack, the admission order follows LIFO ordering and is deeply unfair. One embodiment of a LIFO lock is illustrated by the example pseudo-code below.

```
01: class LIFOLock :
02:   Thread * volatile Head     // waiting threads form a stack
03:
04: Lock (Thread * Self, LIFOLock * L) :
05:   auto w = L->Head
06:   top:
07:   if w == 0 :
08:     // uncontended lock acquisition path
09:     w = CAS (&L->Head, 0, 1)
10:     if w == 0 : return
11:     // CAS failed : this thread raced another and lost
12:     // inopportune interleaving - concurrent interference; L->Head
         changed
13:   // Contended - thread must wait - thread pushes Self onto stack
14:   Self->Grant = 0
15:   Self->Next = w
16:   auto v = CAS (&L->Head, w, Self)
17:   if v != w :
18:     w = v
19:     goto top     // CAS failed; retry
20:   // successful push; begin waiting phase
21:   while Self->Grant == 0 :
22:     Park( )
23:   assert L->Head != 0
24:
25: Unlock (Thread * Self, LIFOLock * L) :
26:   auto w = L->Head
27:   assert w != 0
28:   if w == 1 :
29:     w = CAS (&L->Head, 1, 0)
30:     if w == 1 : return
31:   assert w != 0 && w != 1
32:   // there is at least one thread on the stack
33:   // while the lock is held, the stack only grows
34:   auto nxt = w->Next
35:   assert nxt != null && nxt != Self && nxt != w
36:   // try to pop the head from the stack
37:   auto v = CAS (&L->Head, w, nxt)
38:   if v == w :
39:     // successful pop
40:     assert w->Grant == 0
41:     w->Grant = 1
42:     unpark(w)
43:     return
44:   // The CAS failed
45:   // The only source of interference is newly arrived threads that push
46:   // themselves onto the stack.
47:   // Thus there must be at least two threads on the stack.
48:   // At this point the implementation has the option of retrying,
49:   // or just extracting and waking the 2nd thread.
50:   // This yields a plausibly LIFO history, reduces coherence traffic
51:   // on the Stack field, and yields an unlock( ) that runs in constant-
      time
52:   // with no loops.
53:   assert v != 0 && v != 1
54:   nxt = v->Next
55:   assert nxt != 0 && nxt != 1
56:   // splice nxt out of the stack
57:   v->Next = nxt->Next
58:   assert nxt->Grant == 0
59:   nxt->Grant = 1
50:   unpark(nxt)
```

In the example LIFO lock implementation illustrated above, the waiting threads form a stack. Thus, the lock (which provides succession by direct handoff) employs LIFO admission ordering. Note that LIFO ordering naturally provides concurrency restriction, albeit deeply unfair. Conceptually, the passive set, in this example, consists of threads that reside toward the tail (suffix) of the stack. In this example, arriving and departing threads access the same "Stack" field, creating a coherence hot-spot. In this example, the lock is held if and only if the Head value is non-zero. The scenario in which the Head value is 1 may be a special encoding that indicates the lock is held but that no threads are waiting, while a Head value of 0 indicates that the lock is not held. If the Head value has other value, T, this may indicate that the lock is held and that the thread pointed to by T is the head (top) of the linked list forming the stack of waiting threads. In this example, the stack is intrusively linked through the thread "Next" fields, and the final thread in the stack has a Next value of 1.

In the example illustrated above, the stack has a multiple producer single consumer (MPSC) access model. Here, any arriving thread (e.g., any thread that encounters contention upon arrival at the LIFO lock and must wait to acquire it) can push itself onto the stack at any time using a lock-free CAS-type operation. However, only the current LIFO lock owner can perform a pop operation. Thus, the mutual exclusion properties of the lock itself may ensure that there is at most one consumer (pop operation) at any given time. In at least some embodiments, this may be sufficient to avoid any ABA stack corruption pathologies that can manifest under general MPMC access.

As noted above, a LIFO lock may provide succession by direct handoff. Typically, a direct handoff succession policy works well with a spin-then-park waiting strategy. However, the LIFO lock may be an exception. In this example, the most recently arrived waiting threads reside near the head of the stack, and are most likely to be spinning. If the unlock( ) operator pops an element from the stack, that thread is more likely to be spinning than any of the other threads on stack. On the other hand, threads toward the end of the stack are more liable to be parked.

As described above, LIFO admission ordering may be inherently unfair over the short term. However, in some embodiments, some long-term fairness may be imposed by occasionally passing ownership of the LIFO lock to the thread at the tail of the stack rather than to the thread at the head of the stack. A wide variety of possible implementations are possible. In some example embodiments, ownership may be passed to the tail of the stack based on (a) Bernoulli trials via a thread-local uniform pseudo-random number generator (b) a counter that is incremented on each acquisition until it reaches some predetermined upper bound or (c) the amount of time that a thread has waited. In one specific example, a counter may be used to measure how many times the tail has been bypassed in favor of more recently arrived threads, yielding a bounded bypass policy.

In some embodiments, through various transformations, a LIFO lock such as that described above may be made NUMA-friendly. For example, a NUMA-friendly (or NUMA-aware) variant of the LIFO lock may be constructed such that the unlock( ) operator occasionally checks to see if the thread at the head of the stack (e.g., a thread that is about to be popped from the stack) is executing on the currently preferred (or home) NUMA node in a NUMA system. If not, unlock( ) may be configured to pop that element and either move that remote thread to the tail of the stack, or (as with the MCSCR lock described below), move that remote thread to an explicit "cold" list.

Figure 8:
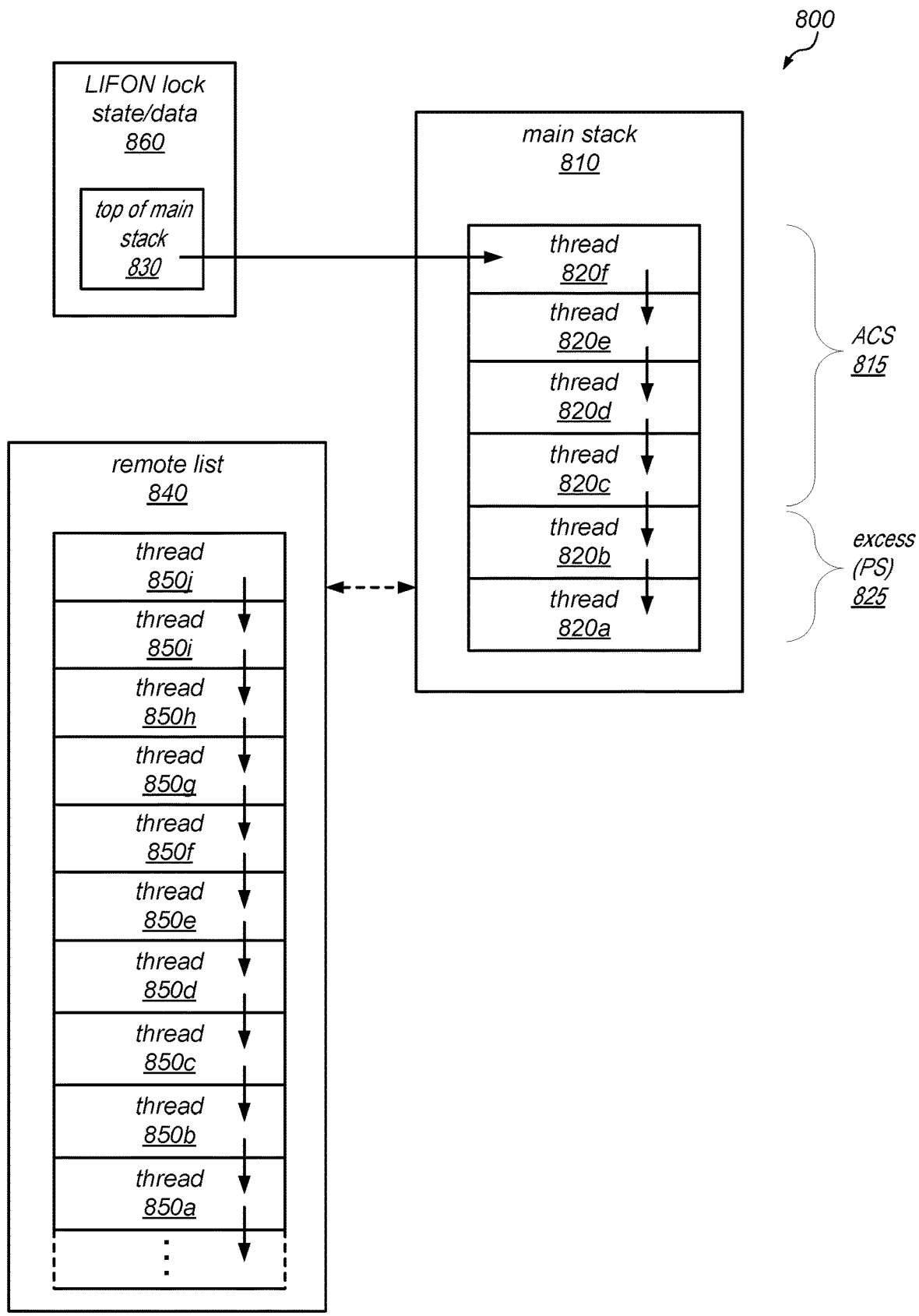
FIG. 8 is a block diagram illustrating one embodiment of NUMA-aware last-in-first-out type lock, as described herein.

One embodiment of NUMA-aware last-in-first-out type lock (e.g., a LIFON lock, which is one example of a concurrency-restricting lock) is illustrated by the block diagram in FIG. 8. In this example, the LIFON lock 800 illustrated in FIG. 8 (which may, in different embodiments, protect a critical section of code in a multithreaded application or a shared resource accessed by multiple threads of a multithreaded application) includes a data structure 860 that stores data representing the lock state and/or other data associated with an outer lock, including a pointer to the top of the main LIFO stack 810, which indicates what may (in many cases) be the successor to the current lock owner. The state/data information may also include metadata representing the current lock owner, a preferred/home node, and/or other information about the lock and its state. In this example, LIFON lock 800 includes a main stack 810 that stores data representing an active circulation set (e.g., a set of threads that circulate over the outer lock, contending for lock ownership of the LIFON lock), and data representing a passive set (e.g., a set of threads that are waiting for an opportunity to contend for ownership of the LIFON lock). Here, the active circulation set, shown as ACS 815 in FIG. 8, may include the threads that are nearest to the head of main stack 810 (e.g., up to a pre-determined number of threads) and the passive set, shown as excess (PS) 825 in FIG. 8, may include threads that are nearer to the tail of main stack 810 (the remaining threads in main stack 810). In this example, threads 820*c*-820*f* may be considered to be members of active circulation set 815, while threads 820*a* and 820*b* may be considered to be members of passive set 825. In some embodiments, all of the threads in the passive set 825 may be excess local threads (e.g., they may be threads that originated from the currently preferred/home node). As illustrated by the downward pointing arrows in main stack 810, the succession of the lock ownership may, in at least most cases, be handled by direct handoff to the next thread in main stack 810.

In this example, LIFON lock 800 also includes a remote list 840, e.g., a data structure that stores information about additional excess threads, including threads that originate from one or more computing nodes other than a current preferred/home node. In some embodiments, if the thread that is at the head of main stack 810 originated from a node other than the preferred/home node, it may be moved to remote list 840, rather than being allowed to assume ownership of the LIFON lock when the current owner releases the lock. Here, remote list 840 includes, at least, threads 850*a*-850*j*. As illustrated by the bi-directional line between main stack 810 and remote list 840, and described in more detail herein, in various embodiments, threads that are part of the active circulation set (or even the passive set) for a LIFON lock may be culled from the main stack 810 and placed on the remote list 840 and/or threads that are part of the remote list 840 for a LIFON lock may be promoted to the main stack 810, e.g., by being pushed onto the head of main stack 810, becoming part of active circulation set 815 (thus being afforded an opportunity to contend for the LIFON lock and increasing long-term fairness with respect to lock ownership). For example, the application of a long-term fairness policy may, from time to time, cause a thread at the head of remote list 840 to be promoted to main stack 810.

As illustrated by the downward pointing arrows in remote list 840, the selection of a thread to be promoted from remote list 840 to main stack 810 may, in at least most cases, be performed according to LIFO ordering. However, in other embodiments, the selection of a thread to be promoted from remote list 840 to main stack 810 may be based on another type of ordering, on the computing nodes from each the threads on remote list 840 originate, or on other criteria (e.g., according to an applicable long-term fairness policy). In some embodiments, the application of a local or short-term fairness policy may, from time to time, cause a thread at the tail of main stack 810 to be pulled from the tail position and pushed onto the head of main stack 810.

Note that FIG. 8 does not necessarily illustrate all of the details or components of a LIFON lock structure, but includes details that are relevant to the implementation of the concurrency-restricting techniques described herein. Note also that a NUMA-oblivious LIFO lock (such as that described earlier) may be similar to the LIFON lock illustrated in FIG. 8, but would not include the remote list 840.

As noted above, a LIFON lock may be a NUMA-friendly variant of a LIFO lock, and may also provide concurrency restriction. As was the case with the NUMA-oblivious LIFO lock, the main list of waiting threads forms a stack, and the LIFON lock provides succession by direct handoff. In this example, surplus local threads reside at the suffix of the stack. This may obviate the need for an explicit list of passive local threads. In contrast, surplus remote threads may reside on an explicit "Remote" list. In at least some embodiments, only the current owner may be able to access the Remote list. As shown in the example pseudo-code below, all editing of the main stack may occur at unlock time within the LockRelease( ) operation, which may include a variety of different triggers, several of which are described in reference to the example LIFON pseudo-code shown below.

Figure 9:
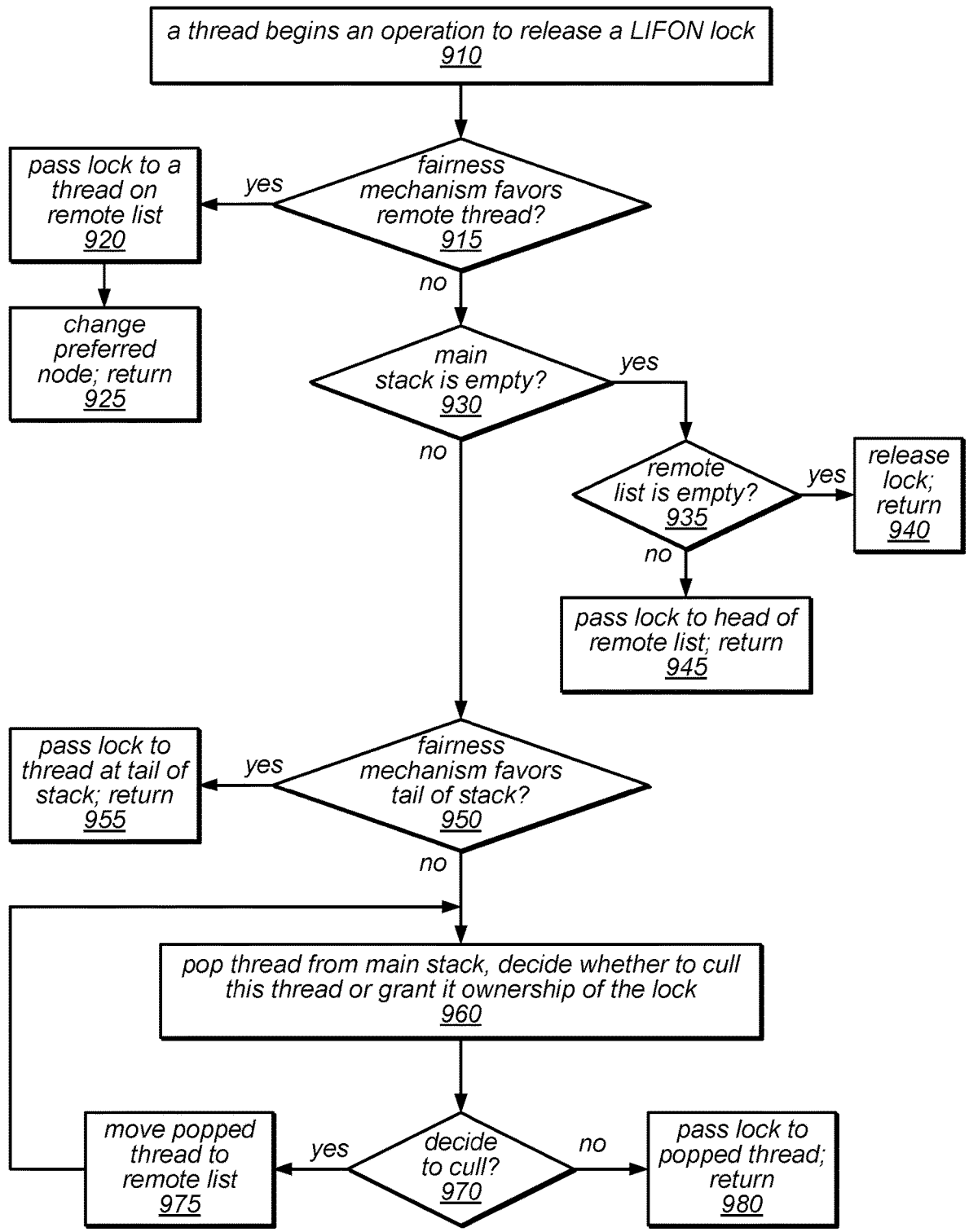
FIG. 9 is a flow diagram illustrating one embodiment of a method for releasing a NUMA-aware LIFO lock, as described herein.

One embodiment of a method for releasing a NUMA-aware LIFO lock (e.g., a LIFON lock) is illustrated by the flow diagram in FIG. 9. As illustrated at 910, in this example, the method may include a thread beginning an operation to release a LIFON lock. If an applicable fairness mechanism (e.g., according to a long-term fairness policy) favors a remote thread (e.g., a thread that originated on a node other than a currently preferred or home node), the method may include passing ownership of the lock to a thread on a remote list for the LIFON lock (e.g., one that maintains data representing threads that originated from a non-preferred (or remote) node and that are waiting for an opportunity to contend for the LIFON lock. This is illustrated in FIG. 9 by the positive exit of 915 and element 920. In various embodiments, the thread on the remote list to which ownership of the lock is passed may be selected using LIFO ordering or using another mechanism. As illustrated in this example, in some embodiments the method may also include changing which node is considered the preferred node (e.g., making the node from which the selected thread originated the preferred node) before returning, as in 925.

In this example, if the applicable fairness mechanism does not (at least at this time) favor a remote thread (shown as the negative exit from 915), and if both the main stack and remote lists are empty (shown as the positive exits from 930 and 935), the method may include releasing the LIFON lock and then returning, as in 940. However, if the applicable fairness mechanism does not (at least at this time) favor a remote thread (shown as the negative exit from 915), and the main stack empty (shown as the positive exit from 930), but the remote list is not empty (shown as the negative exit from 935), the method may include the releasing thread passing ownership of the LIFON lock to the head of the remote list and then returning, as in 945.

As illustrated in this example, if the main stack is not empty (shown as the negative exit from 930) and if an applicable fairness mechanism (e.g., according to a local fairness policy) favors the tail of stack (shown as the positive exit from 950), the method may include the releasing thread passing ownership of the LIFON lock to the thread at tail of the main stack and then returning, as in 955. However, if the main stack is not empty (shown as the negative exit from 930) and if the fairness mechanism does not (at least at this time) favor the tail of the stack (shown as the negative exit from 950), the method may include the releasing thread popping the thread at the head of the main stack from the stack and deciding (e.g., according to an applicable culling policy) whether to cull this thread or grant it ownership of the lock (as in 960).

If the releasing thread decides not to cull the thread that was popped from the main stack (at least at this time), the method may include the releasing thread passing ownership of the LIFON lock to the thread that was popped from the head of the main stack and returning. This is illustrated in FIG. 9 by the negative exit from 970 and element 980. If the releasing thread decides to cull the thread that was popped from the main stack, the method may include the releasing thread moving the thread that was popped from the main stack to the remote list. This is illustrated in FIG. 9 by the positive exit from 970 and 975. As illustrated in this example, the method may include repeating the operations shown at 960 (e.g., popping another thread from the main stack and deciding whether to cull the popped thread or grant ownership of the LIFON lock to the popped thread) one or more times until the lock is passed to another thread, until the remote list and/or the main stack is empty, or until some other condition or event triggers a release of the LIFON lock and a return from the lock release operation without having passed ownership of the LIFON lock to another thread. Note that, in other embodiments, following the negative exit of 975, the method may include repeating the operations illustrated in FIG. 9 beginning at element 915 or 930.

One embodiment of a LIFON lock that provides concurrency restriction is illustrated by the example pseudo-code below. As was the case with the LIFO lock described earlier, the lock state of a LIFON lock may be either 0 or 1, or may point to the head of a stack of threads that are waiting to acquire the LIFON lock (the main stack). As illustrated in FIG. 8 and described above, the LIFON lock includes. In addition, rather than the LIFON lock including a data structure whose data explicitly represents an active circulation set on the LIFON lock, the threads at the front of the main stack may be considered the active circulation set, and the deeper a thread is in the stack (the farther it is from the head of the main stack) the less likely it is that the thread will be able to acquire the LIFON lock. Like the LIFO lock described above, the LIFON lock may be very unfair over the short term, but may be fair over the longer term.

As noted above, and illustrated by the example LIFON pseudo-code below, all editing of the main stack may occur at unlock time within the LockRelease( ) operation, which may include (among other options) any of the following triggers: A) If the main stack is empty but the Remote list is populated, there may be a deficit and the main stack may need to be re-provisioned from the Remote list. This may enforce the work-conserving property of the LIFON lock. B) The top-of-stack pointer identifies the candidate successor. If the thread identified by the top-of-stack pointer is a remote thread, that element may be excised from the main stack and relocated to the tail of the Remote list. That is, it may be culled from the main stack. C) Periodically, the thread at the tail of main stack may be extracted and designated as the successor. In some embodiments, this anti-starvation mechanism may be used to impose long-term intra-node local fairness. D) Periodically, the thread at the head of the remote list may be extracted and designated as the successor, and the value of the indicator of the currently preferred (home) node, LHome, may be updated accordingly. In some embodiments, this anti-starvation mechanism may be used to impose long-term inter-node fairness. In some embodiments, rather than maintaining a single unified list of all threads from remote nodes, a LIFON lock may include multiple stacks (e.g., one for each node), and the long-term fairness policy may cause the preferred (home) node to switch between them (e.g., in a round-robin fashion or using another fairness mechanism). In some embodiments, the LIFON lock may maintain multiple node-specific remote lists. For example, in a four-node system, a remote list that is specific to node 0 (used when node 0 is the preferred/home node) would include threads from nodes 1-3, a remote list that is specific to node 1 (used when node 1 is the preferred/home node) would include threads from nodes 0, 2, and 3, and so on.

In the example LIFON pseudo-code shown below, the operation Bernoulli(Self,P) may represent a Bernoulli trial implemented via a thread-local uniform pseudo-random number generator. In various embodiments, Bernoulli( ) may return true if the next random value is <P. In this example, the "Thread" structure includes Next, Grant and NodeID fields for use by the lock subsystem. Note that, even though the prevailing admission order for the LIFON lock is LIFO ordering, by minimizing the ACS size a round-robin cyclic admission order schedule may be enforced. For example, if there is only one waiting member of the ACS at unlock( ) time, then there is only one possible choice for a successor.

```
001: Class LIFON :
002:   Thread * Stack ;
003:   Thread * Remote ;      // list of Excess remote threads
004:   int LHome ;            // preferred (home) NUMA node
005:   int Epoch ;
006:
007: LockAcquire (Thread * Self, LIFON * L) :
008:   auto w = L->Stack
009: Retry:
010:   if w == 0 :
011:     // uncontended lock release path ...
012:     w = CASP (&L->Stack, 0, 1) ;
013:     if w == 0 : return ;
014:
015:   ASSERT w != 0 ;
016:   Self->Grant = 0 ;
017:   Self->NodeID = CurrentNode( ) ;
018:   Self->Next = w ;
019:   intptr_t v = CASP (&L->Stack, w, Self) ;
020:
021:   if v != w :
022:     // CAS failed
023:     w = v ; goto Retry ;
024:
025:   // Waiting phase
026:   while Self->Grant == 0 :
027:     Park ( ) ;
028:   ASSERT L->Stack != 0 ;
029:   ASSERT L->Stack != Self ;
030: }
031:
032: static void LockRelease (Thread * Self, LockType * L) :
033:   // Periodically :
034:   // Anti-starvation - impose long-tern inter-node fairness
035:   // pop element from Remote list
036:   // Pass ownership of lock to that element
037:   // Change LHome accordingly
038:   // Over time, the Remote list is expected to self-sort
039:   if L->Remote != NULL && Bernoulli (Self, RPrb) :
040:     ASSERT L->Stack != 0 ;
041:     Thread * r = L->Remote ;
042:     L->Remote = r->Next ;
043:     L->LHome = r->NodeID ;     // change preferred NUMA node
044:     L->Epoch ++ ;
045:     ASSERT r->Grant == 0 ; r->Grant = 1 ; Unpark(r) ;
046:     return ;
047:
048: Retry :
049:   auto w = L->Stack ;
050:   if w == 1 :
051:     // Deficit on main stack ; try to re-provision from Remote list
052:     // enforce work-conserving property
053:     // If main stack is empty, then revert to head of remote list
054:     Thread * r = L->Remote ;
055:     if r != NULL :
056:       L->Remote = r->Next ;
057:       ASSERT r->Grant == 0 ; r->Grant = 1 ; Unpark(r) ;
058:       return ;
059:
060:     // normal classic uncontended unlock
061:     // Both main stack and remote list are empty
062:     w = CASP (&L->Stack, 1, 0) ;
063:     if w == 1 : return ;
064:
065:   ASSERT w != 0 && w != 1 ;
066:
067:   // Impose long-term intra-node local fairness - anti-starvation
068:   // occasionally extract tail of stack as successor
069:   // the head of the list is volatile and vulnerable to concurrent modification
070:   // but the interior of the list is stable while the lock remains held.
071:   // Try to pop from tail :
072:   if Bernoulli (Self, TailPrb) :
073:     // remove tail from list and grant ownership to tail
074:     auto Tail = PopTail (m->Stack) ;
075:     if Tail != NULL :
076:       ASSERT Tail->Grant == 0 ; Tail->Grant = 1 ; Unpark(Tail) ;
077:       return ;
```

```
078:
079:   // There is at least one thread on the stack
080:   // While locked, the stack is grow-only : push-only
081:   TryPop :
082:     Thread * n = w->Next ;
083:     ASSERT n != NULL ;
084:     ASSERT n != w ;
085:
086:     auto v = CASP (&L->Stack, w, n) ;
087:     if v == w :
088:       // CAS was successful ; w has been successfully popped from the top-of-stack
089:       // w is now detached
090:       // Decide whether to pass ownership to w or cull it the Remote list.
091:
092:       if w->NodeID != L->LHome :
093:         // w is remote!
094:         // Avoid futile culling ...
095:         // Cull "w" only if there are potentially better candidates on either the main
096:         // stack or on the Remote list.
097:         // There is no point in culling "w" if both the main stack is empty and if all
098:         // members of the Remote list are known with certainty to be remote.
099:         // Head->Epoch == L->Epoch implies that all members of the Remote list are
100:         // definitely remote.
101:         // If "w" were to be culled naively when n == 1 and (Head == null or
102:         // Head->Epoch == L->Epoch) then the admission schedule would devolve to
103:         // round-robin, failing to benefit from concurrency restriction.
104:         Thread * Head = L->Remote ;
105:         if n != 1 || (Head != NULL && Head->Epoch != L->Epoch) :
106:           // Cull remote element from main stack to Remote list
107:           w->Epoch = L->Epoch ;
108:           Append w to L->Remote list
109:           goto Retry ;      // transfer remote prefix
110:
111:       ASSERT w->Grant == 0 ; w->Grant = 1 ; unpark(w) ;
112:       return ;
113:
114:     // CAS failed; thread raced and lost
115:     // inopportune interleaving -- concurrent interference -- race
116:     // some other thread modified L->Stack in the LD-CAS window above
117:     // new threads have arrived in interim window
118:     w = v ;
119:   goto TryPop ;
120:
121:
```

In the example pseudo-code above, the call to the Bernoulli operation (at line 39) may implement a randomization similar to a biased coin toss, in which the second parameter (RPrb) represents the probability that the operation will return true. In some embodiments, this parameter may be set so that this probability is very low (e.g., so that the operation returns true for only about 1 out of every 1000 trials). In this example, at line 50, if it is determined that the main stack has run out of nodes, it may need to be re-provisioned. Although taking threads from the remote list may not be preferable, one of the threads on the remote list may be moved to the main stack if there are no better options.

In this example, the policy that is implemented for imposing intra-node long-term fairness (one that designates the tail of the main stack, rather than the head of the main stack, as the successor) is described in lines 67-72. In this example, the variable at line 92 identifies the current "preferred home node", which is the NUMA node being served at the moment. As described in the example pseudo-code above, a thread may be pulled off the local (main) stack, but the LIFON mechanisms may have changed which NUMA node is the preferred (home) node recently. In this case, the thread that was pulled off the local stack may actually be considered to be a remote thread, and may be transferred from the main stack to the remote list.

In some systems, by making the set of changes to the LIFO lock described herein, a LIFO lock that is deeply unfair and NUMA-oblivious may be transformed into a lock that is unfair in the short term for the threads in a given node (the preferred/home node), but is fair over the long term for these local threads (due to the occasional selection of the tail node) and that is also NUMA-aware. As described herein, the resulting LIFON lock may attempt to keep ownership on a given node (e.g., by keeping the remote threads sequestered away on a separate remote list), but may apply long-term fairness policies such as those described herein. This new LIFON lock has, in various experiments, been found to work quite well for a variety of multithreaded applications.

In some embodiments, an MCS type lock may be modified to provide concurrency restriction by adding an explicit list of passive or "cold" threads. In such embodiments if, at unlock( ) time, there exist any intermediate nodes in the queue between the lock owner's node and the current tail, there are surplus threads in the ACS. In this case, one of the surplus threads may be unlinked and excised, and then transferred to the passive list on which "cold" threads reside. Conversely, if, at unlock( ) time, the main queue is empty except for the owner's node, a node may be extracted from the passive list and inserted into the queue at the tail of the queue, and then ownership may be passed to that thread. In some embodiments, a concurrency-restricting variant of an MCS type lock may directly edit the MCS chain to shift threads back and forth between the main chain and the explicit list of passivated threads. One embodiment of a concurrency-restricting variant of an MCS type lock (referred to herein as an MCSCR lock) is illustrated by the example pseudo-code below.

In this example, the MCSCR lock is NUMA-oblivious (which may be perfectly suitable in certain circumstances, such as in a non-NUMA system). Note that a NUMA-aware variant of this lock (referred to herein as an MCSCRN lock) is illustrated by the example pseudo-code in a subsequent listing. The example MCSCR lock illustrated below attempts to restrict the number of threads that are circulating, without regard to the demographic makeup of the threads that are circulating. Here, in contrast with a standard MCS lock, the release method includes a call to a Bernoulli operation (at line 58) whose return value is used to decide when (and whether) to apply a long-term fairness policy to the selection of the successor. In this example, in addition to the modified MCS lock, the MCSCR lock includes an excess list, which may be similar to the remote list of the previous example, except that the threads on the list do not have to be remote. Instead, the threads on the excess list need only be threads that do not need to be in circulation in order to keep the lock saturated.

As illustrated in the example pseudo-code below, in various embodiments, an MCSCR lock may provide succession by direct handoff. In this example, the "Excess" list (which is a singly-linked null-terminated list) contains the passive set and is protected by the main lock itself, such that only the current owner can access the Excess list. As with other concurrency-restricting locks described herein, all editing of the main MCS chain may occur at unlock time within the LockRelease( ) operation, which may include (among other options) any of the following triggers: A) If there is a deficit in the main list, an attempt may be made to re-provision the main list from the head of the Excess list. This preserves the work-conserving property of the lock. B) If there are surplus threads in the main MCS chain, threads may be culled and excised, and then moved to the tail of excess list. The "surplus" condition may be detected if there are three or more threads on the main MCS chain. For example, one of the nodes on the chain is associated with the current owner. If there is a second element in the chain, then ownership will be granted to that thread when the owner releases the lock. If there are three or more elements in the chain, there is an excess of threads, and a culling operation may be performed in order to provide concurrency restriction. C) Periodically, to impose long-term intra-node fairness the head of the Excess list may be popped and inserted into the main MCS chain. That is, an element may be migrated from the passive set to the active circulation set. Subsequently, some other member of the active circulation set will be detected as surplus and displaced to the Excess list.

In some embodiments, this approach may be extended to provide concurrency restricting by using thread ordinal IDs (0, 1, 2, etc.) as priority indicators, and periodically shuffling the ordinals, or defining the effective priority of a thread as follows: EffectivePriority=(AssignedOrdinal+RRBasis) mod MaxPriority, where AssignedOrdinal is a thread-local variable that reflects the thread's assigned unique order identification number. In such an embodiment, to impose long-term fairness, the RRBasis (which may be a global variable) may be peridocially advanced.

One embodiment of an MCSCR lock is illustrated in the example pseudo-code below.

```
001: // Classic MCS "QNode"
002: // The QAlloc( ) and QFree( ) operators allocate and free QNode instances.
003: // The SWAP( ) operator atomically loads the value from the address given
004: // as the 1st argument and stores the 2nd argument into that address, and
005: // then returns the original value.
006:
007: Class QNode :
008:    Thread * Assoc
009:    volatile int Event
010:    QNode * Next
011:
012: Class MCSCRLock :
013:    QNode * Tail      // tail of MCS chain : threads enqueue here
014:    QNode * Owner     // head of MCS chain : current owner
015:    QNode * Excess    // PS
016:
017: // Pass and grant ownership to thread associated with "succ"
018: // wake thread -- succession by direct handoff
019:
020: Resume (QNode * succ) :
021:    Thread * up = succ->Assoc ;
022:    ASSERT succ->Event == 0 ;
023:    succ->Event = 1 ;
024:    Unpark(up) ;
025: }
026:
027: // LockAcquire( ) : almost unchanged from baseline MCS
028:
029: LockAcquire (Thread * Self, MCSCRLock * m) :
030:    QNode * n = QAlloc (Self) ;
031:    n->Assoc = Self ;
032:    n->Next = NULL ;
033:    n->Event = 0 ;
034:    QNode * prv = SWAPP (&m->Tail, n)
035:    if pry != NULL :
036:       prv->Next = n ;
037:       while n->Event == 0 :
038:          Park ( ) ;
039:
```

```
040:    // Record the current owner node : memorize for subsequent unlock
041:    m->Owner = n ;
042:
043: LockRelease (Thread * Self, MCSCRLock * m) :
044:    ASSERT m->Tail != NULL ;
045:    QNode * n = m->Owner ;
046:    ASSERT n != NULL ;
047:    QNode * succ = n->Next ;
048:
049:    // Periodically move and element from Excess list into main MCS chain
050:    // Impose long-term fairness ; anti-starvation
051:    // Force circulation between ACS and Excess
052:    // Injecting an additional thread into ACS will usually cause and result in
053:    // subsequent culling of excess threads from the ACS.
054:    // Bernoulli( ) is a Bernoulli trial implemented via a thread-local uniform
055:    // pseudo-random number generator.
056:    // Bernoulli( ) returns true if the next random value is < PE.
057:    QNode * k = m->Excess ;
058:    if k != NULL && Bernoulli (Self, PE) :
059:        // Extract element from m->Excess that has waited the longest
060:        k = PopTailElement (&m->Excess) ;
061:
062:        // Now insert k into main MCS chain
063:        ASSERT k->Event == 0 ;
064:        // insert k at tail
065:        // The following is analogous to arrival code in LockAcquire( )
066:        // Specialized variant - it is known that the chain is populated with at
067:        // least one element : k
068:        k->Next = NULL ;
069:        QNode * prv = SWAP (&m->Tail, k) ;
070:        ASSERT prv != NULL ;
071:        prv->Next = k ;
072:        for :
073:            succ = n->Next ;
074:            if succ != NULL : break ;
075:            Pause( ) ;
076:        ASSERT succ != NULL ;
077:        Resume (succ) ;
078:        QFree (Self, n) ;
079:        return ;
080:
081:    if succ == NULL :
082:        // No apparent visible successors on main MCS chain
083:        // there is a deficit : move from Excess list to ACS - re-provision
084:        // Critical property : work conserving
085:        QNode * k = m->Excess ;
086:        if k != NULL :
087:            // pop from Head of Excess List : most recently arrived thread
088:            // most likely to still be spinning in STP waiting
089:            // anticipate and prepare for insertion at m->Tail
090:            m->Excess = k->Next ;
091:            k->Next = NULL ;
092:            ASSERT k->Event == 0 ;
093:            if CASP (&m->Tail, n, k) == n :
094:                // Success
095:                Resume (k) ;
096:                QFree (Self, n) ;
097:                return
098:            }
099:            // CAS failed - inopportune interleaving
100:            // this thread raced and lost ; some other thread updated m->Tail in window
101:            // recent arrival updated m->Tail
102:            // restore K to Excess
103:            k->Next = m->Excess ;
104:            m->Excess = k ;
105:
106:        if CASP (&m->Tail, n, NULL) == n :
107:            QFree (Self, n) ;
108:            return
109:
110:        // rarely taken path : latent-tardy store into n->Next
111:        // Wait for chain to resolve
112:        for :
113:            succ = n->Next ;
114:            if succ != NULL break ;
115:            Pause( ) ;
116:
117:
```

```
118:    ASSERT succ != NULL ;
119:    ASSERT n->Next == succ ;
120:    ASSERT succ != n ;
121:    ASSERT succ->Event == 0 ;
122:    ASSERT m->Tail != n ;
123:
124:    // Cull excess threads from ACS into Excess list
125:    // MOVE FROM Active-Circulating set [ACS] to Excess ; cull excess
126:    // Interior of MCS chain is stable for owner
127:    // ss != null implies excess-surplus ; main list is overprovisioned
128:    // Extract victim and move from MCS chain to head of Excess ; push
129:
130:    Grind : (0) ;
131:    QNode * ss = succ->Next ;
132:    if ss != NULL :
133:       ASSERT ss->Event == 0 ;
134:       ASSERT m->Tail != succ ;
135:       // Have excess threads on main MCS chain ; more than needed for saturation
136:       // Succ is surplus - excess ; not needed to saturate lock
137:       // Splice out succ from main MCS chain ; excise and cull
138:       // Succ is in the interior and is NOT at the tail
139:       n->Next = ss ;
140:
141:       // Move succ onto Excess list
142:       // Prepend succ to Excess : push ; LIFO order
143:       succ->Next = m->Excess ;
144:       m->Excess = succ ;
145:
146:       // Designate ss as successor ; replace succ
147:       // Pass lock to ss intead of succ
148:       succ = ss ;
149:
150:       // the operation can cull incrementally or "grind" away a complete remote
151:       // prefix of threads from the MCS chain.
152:       // Either approach is viable.
153:       goto Grind ;
154:
155:    ResumeSucc : (0) ;
156:    Resume (succ) ;
157:    QFree (Self, n) ;
158:    return ;
159:
```

In the example pseudo-code above, the fairness policy is applied at line 58 where, every once in a while, a thread is taken out of the excess list (which represents the passive set for this concurrency-restricting lock) and is put back onto the MCS chain (which represents the active circulation set for this lock). Without this operation, the lock would be unfair and could lead to indefinite waiting for at least some threads. In this example, at line 86, the thread may decide that the main MCS queue appears to be empty. Absent an excess list, this would be the point at which a standard MCS lock might transition from the locked state to the unlocked state, because there would be no thread holding the lock and no other threads waiting for the lock. However in the example illustrated above, at the point at which it looks like the lock is going to go unlocked, there may be threads waiting on the excess list. In this case, one of the waiting threads may be pulled off the excess list and ownership of the lock may be passed to that thread.

In the example pseudo-code above, there is a culling operation at line 131. Note: in the MCS chain, there is a node called n that corresponds to the lock owner that is dropping the lock, there is a node that is designated as the successor (succ), and there is a node that is designated as the successor of the successor (ss). In this example, the chain of lock ownership (the MCS chain) goes from n (owner), to succ, to ss. In this example, if there is a node designated as ss, the lock is over-provisioned, i.e., there are more than enough threads on that main chain than are needed to saturate the lock. At that point, a culling operation may be performed. In this example, the culling operation may be configured to extract the middle thread (the thread that was designated as succ) out of the chain and move it to the excess list, this reducing the active circulation set for the lock.

In some embodiments, the MCSCR lock described above may be made NUMA-friendly by intentionally checking (at unlock( ) time) to see if the next thread on the main MCS list of waiting threads resides on the currently preferred NUMA node. If not, the lock implementation may intentionally unlink and sequester that next node, moving it from the main MCS chain to the passive list. Relatedly, when picking threads from the excess list (i.e., the passive set or "cold" list), there may be a preference for threads that reside on the currently preferred NUMA node. In this example, the lock implementation may attempt to keep the threads that are nearby (e.g., those executing on the preferred/home node) toward the front of the excess list and the threads that are farther away (those that are executing on other nodes) toward the tail of the list. Therefore, if there is a need to re-provision the main MCS chain, the threads pulled off the head of the excess list are more likely to be local threads. and the threads that are remote are more likely to be found toward the tail of the excess list In some embodiments, in order to further augment the approach to be NUMA-friendly, the lock implementation may compute a priority as: EffectivePriority=(Node+RRBias) mod NNodes, where RRBias identifies the currently preferred (home) NUMA node, NNodes is the number of NUMA nodes in the system, and Node is a thread-local variable that identifies the current node on which the thread is running.

One embodiment of a MCSCRN lock is illustrated by the example pseudo-code below. In this example, the MCSCRN lock is a NUMA-friendly adaptation of the MCSCR lock described earlier. The lock specifies the currently preferred NUMA node in its "LHome" field, and the admission policies attempt to restrict the ACS to threads from that node. Here, a thread may be considered "local" with respect to the lock if the thread runs on the currently preferred node. Otherwise the thread may be considered remote. As in the previous example, the "Excess" list represents the passive set for the MCSCRN lock. As described above, the head (prefix) of the Excess list tends to contain local threads that have been passivated, and the tail (suffix) tends to contain remote passive thread. Conceptually there may be two distinct lists, ExcessLocal and ExcessRemote, but a single unified list may be more convenient for the implementation, in some embodiments.

As with other concurrency-restricting locks described herein, all editing of the main MCS chain may occur at unlock time within the LockRelease( ) operation, which may include (among other options) any of the following triggers: A) If there is a deficit in the main list, an attempt may be made to re-provision the main list from the head of the Excess list. This preserves the work-conserving property of the lock. B) If there are surplus threads in the main MCS chain, threads may be culled and excised. The "surplus" condition may be detected if there are three or more threads on the main MCS chain. For example, one of the nodes on the chain is associated with the current owner. If there is a second element in the chain, then ownership will be granted to that thread when the owner releases the lock. If there are three or more elements in the chain, there is an excess of threads, and a culling operation may be performed in order to provide concurrency restriction. If the surplus culled thread is local, it may be prepended at the head the Excess list, otherwise it may be appended at the tail of the Excess list. C) Periodically, to impose long-term intra-node fairness the head of the Excess list may be popped and inserted into the main MCS chain. That is, an element may be migrated from the passive set to the active circulation set. Subsequently, some other member of the active circulation set will be detected as surplus and displaced to the Excess list. D) If there is a successor on the main MCS chain and the successor is remote, there are either additional threads on the chain or the excess list is populated. In this case, the successor may be culled to the tail of the Excess list. In this case, the succession policy may prefer a thread from the front of the Excess list or on the main MCS chain over a known remote element. E) Periodically, to impose long-term inter-node fairness, an operation to identify a successor may scan forward through the Excess list, skipping over local elements (threads) until the end of the list is reached or until a non-local element is encountered. That local prefix may then be detached and appended to the end of the Excess list. Finally, the first non-local element may be extracted and ownership of the lock may be passed to it, after which LHome may be updated to reflect that the NUMA node on which the new owner is executing. In this manner, the ACS may subsequently self-sort in an incremental and gradual fashion. After a number of LockRelease( ) calls and culling operations (in response to the changed LHome value), the ACS will tend toward homogeneity (e.g., to be composed of local elements).

```
001: Class QNode :
002:   Thread * Assoc
003:   volatile int Event
004:   QNode * Next
005:   int NodeID
006:
007: Class MCSCRN :
008:   QNode * Tail
009:   QNode * Owner
010:   QNode * Excess
011:   int LHome   // currently preferred NUMA node number
012:
013: LockAcquire (Thread * Self, MCSCRN * m) :
014:   QNode * n = QAlloc (Self) ;
015:   n->Assoc = Self ;
016:   n->NodeID = CurrentNode( ) ;
017:   n->Next = NULL ;
018:   n->Event = 0 ;
019:   QNode * prv = SWAP (&m->Tail, n) ;
020:   if prv != NULL :
021:     prv->Next = n ;
022:     while n->Event == 0 :
023:       Park( )
024:
025:   // Record the current owner node : memorize for subsequent unlock
026:   // Pass "n" from lock to unlock
027:   m->Owner = n ;
028:   return
029:
030: LockRelease (Thread * Self, MCSCRN * m) :
031:   ASSERT m->Tail != NULL ;
032:   QNode * n = m->Owner ;
033:   ASSERT n != NULL ;
034:   top : (0) ;
```

```
035:
036: // Periodically ...
037: // impose long-term Local intra-node fairness ; anti-starvation
038: // Move head of Excess into main chain and ACS
039: //
040: // Force circulation between ACS and Excess
041: // Injecting an additional thread into ACS will _usually cause and result in
042: // subsequent culling of excess threads from the ACS.
043: QNode * k = m->Excess ;
044: ASSERT n != k && k != m->Tail ;
045: if (k != NULL && k->NodeID == m->LHome && Bernoulli (Self, PE) :
046:   // pop k from head of excess
047:   m->Excess = k->Next ;
048:
049:   // insert k into main MCS chain
050:   QNode * succ = n->Next ;
051:   ASSERT (succ != n) ;
052:   // append : insert k to tail of MCS chain
053:   // The following is analogous to arrival code in LockAcquire( )
054:   // Specialized variant
055:   // it is known that the chain is populated with at least one element : k
056:   // Beware that prv might equal n
057:   k->Next = NULL ;
058:   QNode * prv = SWAP (&m->Tail, k) ;
059:   ASSERT prv != NULL && prv != n && prv != k ;
060:   prv->Next = k ;
061:   for :
062:     succ = m->Next
063:     if succ != NULL : break
064:     Pause
065:   Resume (succ) ;
066:   QFree (Self, n) ;
067:   return ;
068:
069: // Periodically ...
070: // Impose long-term inter-node NUMA fairness
071: // scan forward through excess until null or 1st remote element
072: // Rotate local prefix from head to tail of Excess
073: if k != NULL && Bernoulli (Self, PL) :
074:   QNode * LocalPrefix = NULL ;
075:   for :
076:     k = m->Excess ;
077:     if (k == NULL :
078:       // No remote elements found on excess List
079:       // Just leave Excess unchanged
080:       m->Excess = LocalPrefix ;
081:       break ;
082:
083:     int nn = k->NodeID ;
084:     if nn == m->LHome :
085:       m->Excess = k->Next ;
086:       LocalPrefix = AppendTo (LocalPrefix, k) ;
087:       continue ;
088:
089:     // encountered 1st remote element
090:     // Select new-next preferred NUMA node
091:     m->LHome = nn ;
092:     m->Excess = Concatenate (m->Excess, LocalPrefix)
093:     break ;
094:   // fall thru
095:
096:
097:   QNode * succ = n->Next ;
098:   ASSERT succ != n ;
099:   if succ == NULL :
100:     // No apparent visible successors on main MCS chain
101:     // Deficit in main MCS list : re-provision on-demand from Excess
102:     // Move element from head of Excess list to MCS chain
103:     // Critical property : work conserving
104:     if k != NULL :
105:       // completely extract k from Excess list
106:       // anticipate and prepare for insertion at m->Tail
107:       ASSERT k->Event == 0 ;
108:       m->Excess = k->Next ;
109:       k->Next = NULL ;
110:       if CASP (&m->Tail, n, k) == n :
```

```
111:        // Success !
112:        Resume(k) ;
113:        QFree (Self, n) ;
114:        return ;
115:
116:        // CAS failed; inopportune interleaving
117:        // this thread raced and lost; Some other thread updated m->Tail in window
118:        // recent arrival updated m->Tail
119:        // return K to Excess -- repair and undo removal
120:        // return; restore; repair; reinstate;
121:        k->Next = m->Excess ;
122:        m->Excess = k ;
123:
124:        // Classic normal uncontended locking path ...
125:    if CASP (&m->Tail, n, NULL) == n :
126:        QFree (Self, n) ;
127:        return ;
128:
129:        // rarely taken path : latent-tardy store into n->Next
130:        // Wait for chain to resolve
131:    for :
132:        succ = n->Next ;
133:        if succ != NULL break ;
134:        Pause( ) ;
135:
136:    ASSERT succ != NULL ;
137:    ASSERT n->Next == succ ;
138:    ASSERT succ != n ;
139:    ASSERT succ->Event == 0 ;
140:    ASSERT m->Tail != n ;
141:
142:    // Cull excess thread from main MCS chain into Excess list
143:    // Interior of MCS queue is stable for owner
144:    // Check for excess threads/QNodes on the main list.
145:    // ss != null implies excess : main MCS list overprovisioned, at least transiently.
146:    // Identify victim and move from MCS queue to Excess
147:    //
148:    // remark : culling also helps to re-order ACS to reduce ACS intra-cycle
149:    // NUMA node transitions, which in turn reduces lock migration rates.
150:
151:    Grind : (0) ;
152:    QNode * ss = succ->Next ;
153:    if ss != NULL :
154:        // Have excess threads on main MCS chain ; more than needed for saturation
155:        // Splice out succ from main MCS chain; excise and cull
156:        // Succ is in the interior and is NOT at the tail
157:        // Succ is surplus - excess ; not needed to saturate lock
158:        n->Next = ss ;
159:        if succ->NodeID != m->LHome :
160:            // Remote -- Add succ to Excess : append
161:            m->Excess = AppendTo (m->Excess, succ) ;
162:        else
163:            // Local -- Add succ to Excess : prepend for stack LIFO-like admission order
164:            succ->Next = m->Excess ;
165:            m->Excess = succ ;
166:
167:        // Designate ss as successor; replace succ
168:        // Pass lock to ss instead of succ
169:        succ = ss ;
170:        goto Grind ;
171:
172:    if succ->NodeID != m->LHome && m->Excess != NULL :
173:        // Successor is remote and alternative successor exists on Excess list
174:        // Potentially better alternatives exist
175:        // Prefer unknown or local over known remote.
176:        // Try to improve both ACS demographics and order
177:        // Filter and edit ACS to reduce NUMA diversity
178:        // pop K from Excess list
179:        k = m->Excess ;
180:        m->Excess = k->Next ;
181:        ASSERT k != n ;
182:
183:        // append k on MCS chain at tail
184:        k->Next = NULL ;
185:        QNode * prv = SWAPP (&m->Tail, k) ;
186:        ASSERT prv != NULL && prv->Next == NULL && prv != k && prv != n ;
187:        prv->Next = k ;
188:
```

```
189:    // wait for succ->Next to resolve
190:    // it is known it will resolve because k was just added above
191:    QNode * ss
192:    for :
193:      ss = succ->Next
194:      if ss != NULL : break
195:      Pause( )
196:
197:    // excise succ from main MCS chain
198:    n->Next = ss ;
199:
200:    // append succ to Excess List
201:    m->Excess = AppendTo (m->Excess, succ) ;
202:
203:    // Designate ss as successor; replace succ
204:    // Pass lock to ss instead of succ
205:    succ = ss ;
206:
207:    Resume (succ) ;
208:    QFree (Self, n) ;
209:    return ;
210:
```

Figure 10:
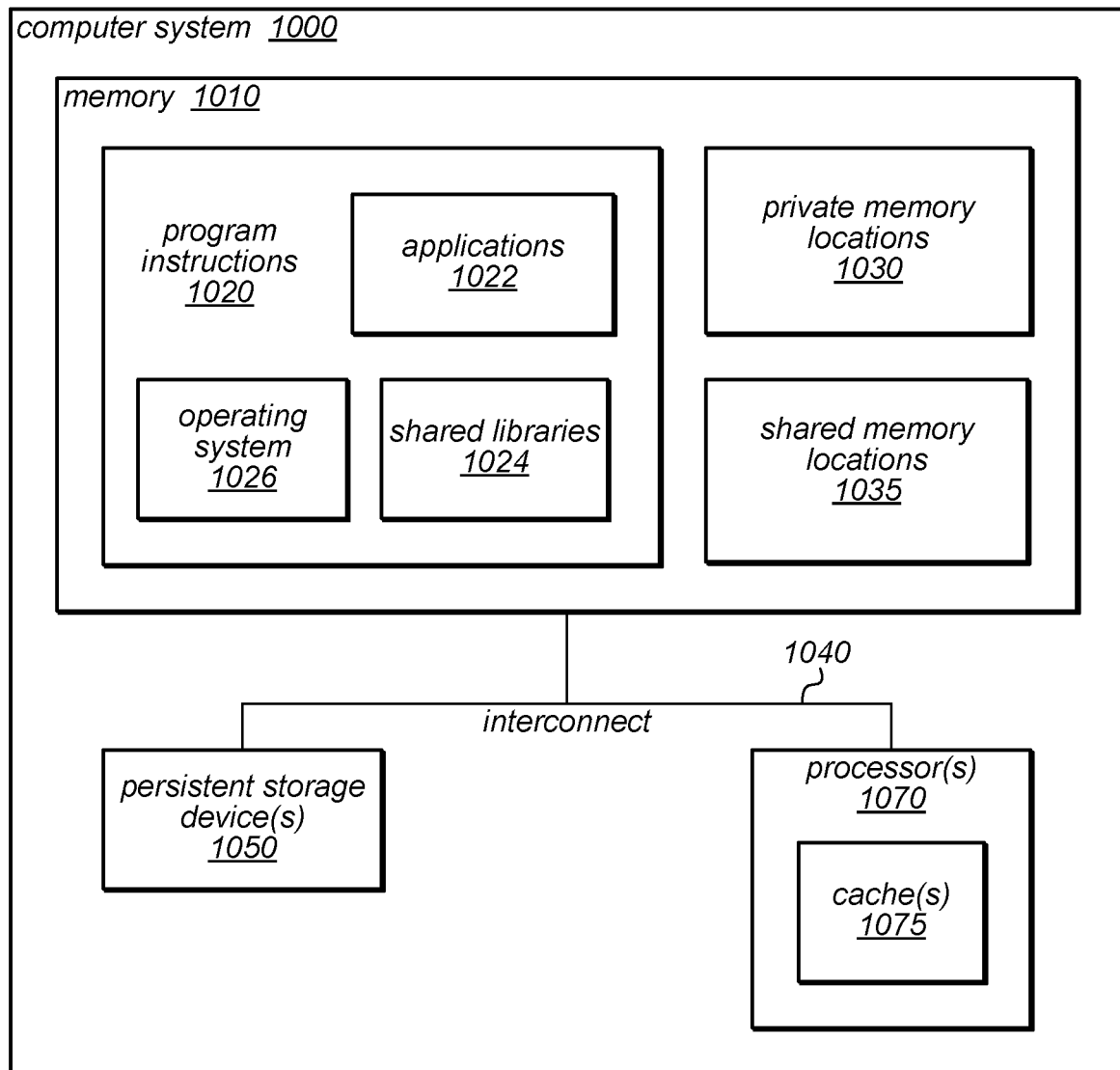
FIG. 10 illustrates a computing system configured to implement some or all of the methods described herein for restricting concurrency on contended locks, according to various embodiments.

Each of the example concurrency-restricting lock algorithms described herein has been implemented within a virtual machine environment and/or a transaction or concurrency support library. The performance improvements over previously best performing locks were often significant. In general, the concurrency-restricting approaches described herein may be applied to conserve (or reduce contention on) any resource that is shared by multiple threads and that may exhibit a kind of thrashing capability under heavy contention. For example, in various embodiments, the shared resources that can be conserved by these concurrency restriction techniques may include any or all of the following:

- cache residency and/or DRAM channel access
- thermal and/or energy headroom
- pipelines
- logical CPU occupancy
- NUMA interconnect bandwidth (for NUMA-aware concurrency restriction)
- traditional memory pressure Example System FIG. 10 illustrates a computing system configured to implement some or all of the methods described herein for restricting concurrency on contended locks, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing NUMA-aware cohort locking and/or NUMA-aware reader-writer locks, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. For example, as illustrated in FIG. 3, multiple processor cores may be included in a single processor chip (e.g., a single processor 1070 or processor chip 310), and multiple processor chips may be included on a CPU board (such as a CPU board 300), two or more of which may be included in computer system 1000. Each of the processors 1070 may include a hierarchy of caches, in various embodiments. For example, as illustrated in FIG. 3, each processor chip 310 may include multiple level 1 caches 330 (e.g., one per processor core) and one or more other caches (which may be shared by the processor cores on the processor chip), such as level 2 caches 335. The computer system 1000 may also include one or more persistent storage devices 1050 (e.g. optical storage, magnetic storage, hard drive, tape drive, solid state memory, etc) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement one or more applications 1022 (which may include one or more accesses to a critical section of code or shared resource protected by a NUMA-aware cohort lock or a NUMA-aware reader-writer lock, as described herein), shared libraries 1024 (which may include a transaction support library and/or a concurrency support library), or operating systems 1026. In some embodiment, program instructions 1020 may be executable to implement a contention manager (not shown). Program instructions 1020 may be encoded in platform native binary, any interpreted language such as Java™ byte-code, or in any other language such as C/C++, Java™, etc or in any combination thereof. The program instructions 1020 may include functions, operations and/or other processes for implementing NUMA-aware cohort locking and/or NUMA-aware reader-writer locks, as described herein. Such support and functions may exist in one or more of the shared libraries 1024, operating systems 1026, or applications 1022, in various embodiments. The system memory 1010 may further comprise private memory locations 1030 and/or shared memory locations 1035 where data may be stored. For example, shared memory locations 1035 may store data accessible to concurrently executing threads, processes, or transactions, in various embodiments. In addition, the system memory 1010 and/or any of the caches of processor(s) 1070 may, at various times, store lock metadata (e.g., lock state information or lock structure header information, identifiers of successor threads, and/or various counters or flags, as described herein), threshold values, policy parameter values, maximum count values, lists or queues of pending, active, and/or passive threads (including queues of sleeping reader threads and/or writer threads), lists of locks currently held for reading by particular threads, one or more reader counters (e.g., a node-local reader counter), and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of locks and structures and particular locking algorithms and policies, it should be noted that the techniques and mechanisms disclosed herein for implementing NUMA-aware lock cohorting and NUMA-aware reader-writer locks may be applicable in other contexts in which critical sections of code and/or shared resources may be protected by other types of locks/structures under different locking algorithms/policies, or in which cohort locks or NUMA-aware reader-writer locks are constructed from different types of locks and structures than those described in the examples herein. It is intended that the following claims be interpreted to embrace all such variations and modifications.

What is claimed:
1. A method, comprising:
performing by a computing device:
beginning execution of a multithreaded application that implements multiple threads that access a critical section of code or a shared resource protected by an outer-inner dual path (OIL) lock, wherein the OIL lock includes an inner lock and an outer lock;
placing a first thread that accesses the critical section or the shared resource in an active circulation set, wherein threads in the active circulation set contend for the outer lock without holding the inner lock;
responsive to a determination that the first thread has acquired the outer lock:
permitting the first thread to access the critical section of code or the shared resource;
responsive to a determination that the active circulation set meets a size threshold:
placing a second thread that accesses the critical section or the shared resource in a passive set, wherein threads in the passive set contend for the inner lock and cannot contend for the outer lock without holding the inner lock; and
responsive to a determination that the second thread in the passive set has acquired the inner lock:
permitting the second thread to contend for the outer lock.
2. The method of claim 1, wherein:
the placing the second thread in a passive set comprises:
causing the second thread to be parked, wherein the second thread is not eligible to be scheduled for execution by the computing device while it is parked.
3. The method of claim 1, further comprising:
performing, by the second thread after the acquiring of the inner lock by the second thread:
repeatedly checking a status of the outer lock to determine whether the outer lock is available; and
responsive to a determination that the outer lock is available, attempting to acquire the outer lock.
4. The method of claim 1, further comprising: performing by a computing device: applying a culling policy to move at least one thread from the active circulation set to the passive set, wherein the culling policy is applied based at least in part on a determined saturation level of the OIL lock.
5. The method of claim 4, wherein:
the computing device implements a multiprocessor system of multiple processor nodes employing a non-uniform memory access (NUMA) memory architecture, and applying the culling policy comprises determining, in the active circulation set, one or more excess threads associated with one or more non-preferred processor nodes to be moved to the passive set.
6. The method of claim 1, further comprising:
performing by the computing device:
applying a fairness policy to move at least one thread from the passive set to the active circulation set, wherein the fairness policy is applied based at least in part one or more of:
an amount of time that a given thread as waited in the passive set;
a value of a counter; and
a value returned by a randomization function.
7. The method of claim 1, further comprising:
subsequent to the accessing of the critical section of code or the shared resource by the first thread:
passing, by the first thread, ownership of the OIL lock to another thread; and
releasing, by the first thread, the OIL lock, including both the outer lock and the inner lock.
8. The method of claim 1, further comprising:
subsequent to the accessing of the critical section of code or the shared resource by the first thread:
determining whether to apply a culling policy to move one or more threads from the active circulation set to the passive set; and
determining whether to apply a fairness policy to move one or more threads from the passive set to the active circulation set.
9. The method of claim 1, further comprising:
responsive to a determination that the second thread in the passive set has acquired the outer lock:
permitting the second thread to access the critical section of code or the shared resource; and
moving the second thread to the active circulation set.

10. The method of claim 1, wherein the outer lock is implemented as a test-and-test-and-set (TATAS) lock.

11. The method of claim 1, wherein the inner lock is implemented as a Mellor-Crummey and Scott (MCS) lock wherein threads contending for the MCS lock are maintained in a linked list and spin on local variables.

12. A system, comprising:
a computing device with one or more hardware processors with associated memory, wherein the memory stores program instructions that when executed on the one or more hardware processors cause the computing device to:
execute a multithreaded application that implements multiple threads that access a critical section of code or a shared resource protected by an outer-inner dual path (OIL) lock, wherein the OIL lock includes an inner lock and an outer lock;
place a first thread that accesses the critical section or the shared resource in an active circulation set, wherein threads in the active circulation set contend for the outer lock without holding the inner lock;
responsive to a determination that a first thread has acquired the outer lock:
permit the first thread to access the critical section of code or the shared resource;
responsive to a determination that the active circulation set meets a size threshold:
place a second thread that accesses the critical section or the shared resource in a passive set, wherein threads in the passive set contend for the inner lock and cannot contend for the outer lock without holding the inner lock; and
responsive to a determination that the second thread in the passive set has acquired the inner lock:
permit the second thread to contend for the outer lock.

13. The system of claim 12, wherein the program instructions when executed on the one or more hardware processors cause the computing device to:
responsive to a determination that the second thread in the passive set has acquired the outer lock:
permit the second thread to access the critical section of code or the shared resource; and
move the second thread to the active circulation set.

14. The system of claim 12, wherein the outer lock is implemented as a test-and-test-and-set (TATAS) lock.

15. The system of claim 12, wherein the inner lock is implemented as a Mellor-Crummey and Scott (MCS) lock wherein threads contending for the MCS lock are maintained in a linked list and spin on local variables.

16. The system of system 12, wherein:
to place the second thread in a passive set, the program instructions when executed on the one or more hardware processors cause the computing device to:
cause the second thread to be parked, wherein the second thread is not eligible to be scheduled for execution by the computing device while it is parked.

17. The system of claim 12, wherein the program instructions when executed on the one or more hardware processors cause the computing device to cause the second thread to:
after the acquiring of the inner lock by the second thread:
repeatedly check a status of the outer lock to determine whether the outer lock is available; and
responsive to a determination that the outer lock is available, attempt to acquire the outer lock.

18. The system of claim 12, wherein the program instructions when executed on the one or more hardware processors cause the computing device to:
apply a culling policy to move at least one thread from the active circulation set to the passive set, wherein the culling policy is applied based at least in part on a determined saturation level of the OIL lock.

19. The system of claim 12, wherein the program instructions when executed on the one or more hardware processors cause the computing device to:
apply a fairness policy to move at least one thread from the passive set to the active circulation set, wherein the fairness policy is applied based at least in part one or more of:
an amount of time that a given thread as waited in the passive set;
a value of a counter; and
a value returned by a randomization function.

20. One or more non-transitory, computer-readable storage media storing program instructions that when executed on or across one or more processors cause the one or more processors to:
execute a multithreaded application that implements multiple threads that access a critical section of code or a shared resource protected by an outer-inner dual path (OIL) lock, wherein the OIL lock includes an inner lock and an outer lock;
place a first thread that accesses the critical section or the shared resource in an active circulation set, wherein threads in the active circulation set contend for the outer lock without holding the inner lock;
responsive to a determination that a first thread has acquired the outer lock:
permit the first thread to access the critical section of code or the shared resource;
responsive to a determination that the active circulation set meets a size threshold:
place a second thread that accesses the critical section or the shared resource in a passive set, wherein threads in the passive set contend for the inner lock and cannot contend for the outer lock without holding the inner lock; and
responsive to a determination that the second thread in the passive set has acquired the inner lock:
permit the second thread to contend for the outer lock.

* * * * *

UNITED STATES PATENT AND TRADEMARK OFFICE
CERTIFICATE OF CORRECTION

PATENT NO. : 11,314,562 B2
APPLICATION NO. : 16/570952
DATED : April 26, 2022
INVENTOR(S) : Dice It is certified that error appears in the above-identified patent and that said Letters Patent is hereby corrected as shown below:

In the Specification

In Column 1, Line 40, delete "been" and insert -- be --, therefor.

In Column 4, Line 9, delete "been" and insert -- be --, therefor.

In Column 15, Line 15, delete "unlock( )" and insert -- unlock( ), --, therefor.

In Column 15, Line 34, delete "unpark( )" and insert -- unpark( ). --, therefor.

In Column 26, Line 36, after "policy" insert -- . --, therefor.

In Column 28, Line 39, delete "ST OuterLock,"" and insert -- ST OuterLock;" --, therefor.

In Column 29, Line 54, delete "MCSAcquire( )" and insert -- MCSAcquire( ), --, therefor.

In Column 30, Line 9, delete "TrySpin( )" and insert -- TrySpin( ), --, therefor.

In Column 44, Line 67, delete "pry !" and insert -- prv ! --, therefor.

In Column 48, Line 62, after "list" insert -- . --, therefor.

In the Claims

In Column 59, Line 11, in Claim 16, delete "The system of system" and insert -- The system of claim --, therefor.

Signed and Sealed this
Eleventh Day of October, 2022

Katherine Kelly Vidal
*Director of the United States Patent and Trademark Office*